US012785740B2

(12) United States Patent
Wu et al.

(10) Patent No.: US 12,785,740 B2
(45) Date of Patent: Nov. 3, 2026

(54) NOISE SUPPRESSION CIRCUIT

(71) Applicant: NATIONAL TAIWAN UNIVERSITY, Taipei City (TW)

(72) Inventors: Tzong-Lin Wu, Taipei City (TW); Chih-Yu Fang, Taipei City (TW); Li-Ching Huang, New Taipei City (TW)

(73) Assignee: NATIONAL TAIWAN UNIVERSITY, Taipei City (TW)

( * ) Notice: Subject to any disclaimer, the term of this patent is extended or adjusted under 35 U.S.C. 154(b) by 94 days.

(21) Appl. No.: 18/915,559

(22) Filed: Oct. 15, 2024

(65) Prior Publication Data

US 2025/0253878 A1 Aug. 7, 2025

(30) Foreign Application Priority Data

Feb. 7, 2024 (TW) ................................ 113105047

(51) Int. Cl.
*H04B 1/10* (2006.01)

(52) U.S. Cl.
CPC ... *H04B 1/1027* (2013.01); *H04B 2001/1072* (2013.01)

(58) Field of Classification Search
CPC ...................... H04B 1/1027; H04B 2001/1072
USPC ......................... 375/219, 267, 285, 346, 350
See application file for complete search history.

(56) References Cited

U.S. PATENT DOCUMENTS 8,060,028 B1 * 11/2011 Ho ......................... H04B 1/525 455/296
10,581,155 B1 * 3/2020 Gradinaru .............. H04B 1/109
2007/0015468 A1 * 1/2007 Kouki .................... H04B 1/525 455/63.1
2011/0212696 A1 * 9/2011 Hahn ..................... H04B 1/525 455/83
2011/0256857 A1 * 10/2011 Chen ...................... H01Q 1/521 455/7
2012/0127034 A1 * 5/2012 DiFonzo .............. H01Q 3/2682 342/375
2014/0099893 A1 4/2014 Kheirkhahi et al.
(Continued)

FOREIGN PATENT DOCUMENTS

TW 201141098 A1 11/2011
TW 201214999 A1 4/2012
TW 201407976 A 2/2014

*Primary Examiner* — Emmanuel Bayard
(74) *Attorney, Agent, or Firm* — Li & Cai Intellectual Property (USA) Office

(57) ABSTRACT

A noise suppression circuit is provided. The noise suppression circuit is provided between a transmission interface and a receiving interface. In particular, the transmission interface includes a digital interface, a power transmission interface, or a combination thereof. The noise suppression circuit includes a first noise suppression component and a second noise suppression component. The second noise suppression component is connected to the first noise suppression component through a phase adjusting component. Some signals on the transmission interface are transmitted to the receiving interface through the first noise suppression component, the phase adjusting component and the second noise suppression component. As a result, interference from the transmission interface to the receiving interface is suppressed.

10 Claims, 27 Drawing Sheets

(56) References Cited

U.S. PATENT DOCUMENTS

| | | | | |
|---|---|---|---|---|
| 2016/0094331 | A1* | 3/2016 | White | H04L 5/14 370/278 |
| 2017/0264327 | A1* | 9/2017 | Clark | H04B 1/12 |
| 2019/0207633 | A1* | 7/2019 | Huusari | H04B 1/0475 |
| 2020/0161755 | A1* | 5/2020 | Olesen | H04B 1/525 |
| 2020/0228159 | A1* | 7/2020 | Raghavan | H04B 1/0475 |

* cited by examiner

Inteference level from Tx4 to Rx4 : -36 dB -> -49 dB

Inteference level from Tx4 to Rx4 : -35 dB -> -67 dB

Inteference level from Tx4 to Rx4 : -45 dB -> -72 dB

Inteference level from Tx5 to Rx5 : -35 dB -> -67 dB

Inteference level from Tx5 to Rx5 : -45 dB -> -55 dB

Inteference level from Tx6 to Rx6 : -35 dB -> -45 dB

Inteference level from Tx6 to Rx6 : -45 dB -> -59 dB

NOISE SUPPRESSION CIRCUIT

CROSS-REFERENCE TO RELATED PATENT APPLICATION

This application claims the benefit of priority to Taiwan Patent Application No. 113105047, filed on Feb. 7, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to noise suppression, and more particularly to a noise suppression circuit.

BACKGROUND OF THE DISCLOSURE

With the rapid development of science and technology, functions of electronic products are becoming increasingly complex. In particular, high-speed data transmission is required in various applications such as high-quality image transmission, high-speed computing and artificial intelligence applications, and thus transmission speed and frequencies of various transmission interfaces must be significantly increased. However, various structures on the transmission interfaces, such as high-speed connectors, single-ended or differential transmission lines, still inevitably produce radiation interference (forming an interference source), which interferes with other receiving interfaces such as Wi-Fi, Bluetooth or 5G mobile network, resulting in a reduction in a signal to noise ratio (SNR) and an increase in a bit error rate (BER).

One of conventional interference solutions is a suppression component configuration solution. In the suppression component configuration solution, various suppression components such as a conjugate coil, a common mode filter and an electromagnetic interference (EMI) filter are used for filtering incidental noise (such as common mode noise or high frequency noise) of the interference source on the transmission interfaces. However, signals transmitted on the transmission interfaces cannot be filtered (otherwise it will affect transmission quality of the signals or even block transmission of the signals), and radiation noise cannot be eliminated by the suppression components.

Another one of the conventional interference solutions is a mechanical coating solution. In the mechanical coating solution, sensitive structures (such as jumpers or connectors) on the transmission interfaces are covered with metal shells, metal foils or absorbing materials. However, the mechanical coating solution faces practical problems such as poor stability, difficult production processes, difficulty in identifying radiation or noise sources, and incomplete coverage problems, so as to result in poor performance or cost waste.

Yet another one of the conventional interference solutions is a noise suppression circuit solution. In the noise suppression circuit solution, a noise suppression circuit is configured to reduce an influence of an interference source to an interface. In the noise suppression circuit solution, noise interference is offset or neutralized by artificially introducing additional paths rather than blocking a coupling of the interference source to the interface. As a result, the noise interference is more completely eliminated in the noise suppression circuit solution than that of the suppression component configuration solution and the mechanical coating solution.

However, interference of the transmission interface and imperfect structures (such as connectors, transmission lines, through holes passing through a circuit board, jumpers, etc.) on transmission paths to the receiving interface cannot be evaluated until design of the electronic product is completed. This interference is very complex and is thus difficult to be simulated fully. Furthermore, the designed electronic product does not have enough space to accommodate a decoupling circuit. If the decoupling circuit needs to be designed together with the transmission interface, overall design time and complexity are increased to an unreasonable level. Therefore, suppression of the interference has yet to be performed on noise suppression paths between the transmission interface and the receiving interface.

SUMMARY OF THE DISCLOSURE

A purpose of the present disclosure is to provide a noise suppression circuit to solve a problem that interference of signals or noise on a transmission interface to a receiving interface cannot be suppressed in the related art. In the related art, a conventional filter cannot suppress the interference, and a conventional interference eliminating method of covering the transmission interface or isolating the transmission interface from the receiving interface only partially eliminates the interference. In contrast, the noise suppression circuit of the present disclosure is capable of more completely and efficiently eliminating the interference of the signals or noise on the transmission interface to the receiving interface under a lower complexity condition. A plurality of functional components are able to be modularized in the noise suppression circuit of the present disclosure. Some of the plurality of functional components included in the noise suppression circuit can be adjusted or replicate for adjusting an entirety of the noise suppression circuit. Compared with the conventional solution applied to an antenna, the noise suppression circuit of the present disclosure greatly reduces complexity of common simulation and co-design.

In order to achieve the above-mentioned functions, the present disclosure provides a noise suppression circuit. The noise suppression circuit of the present disclosure is disposed between the transmission interface and the receiving interface. The transmission interface includes a digital interface, a power transmission interface or a combination thereof. A transmission interface signal of the transmission interface is transmitted along one or more transmission path. A receiving interface signal of the receiving interface is transmitted along one or more transmission path. The noise suppression circuit includes a first noise suppression component and a second noise suppression component. The first noise suppression component is connected to the one or more transmission path of the transmission interface. The transmission interface signal on the one or more transmission path of the transmission interface is transmitted through the first noise suppression component. The second noise suppression component is connected to the one or more transmission path of the receiving interface. The receiving interface signal on the one or more transmission path of the receiving interface is transmitted through the second noise suppression component. The second noise suppression component is connected to the first noise suppression component through a phase adjusting component. The transmission interface signal and the receiving interface signal are partly transmitted through the first noise suppression component, the phase adjusting component and the second noise suppression component to the receiving interface for suppressing interference from the transmission interface to the receiving interface.

In addition, the noise suppression circuit of the present disclosure is disposed between a transmission interface and a receiving interface for eliminating interference from the transmission interface to the receiving interface. The transmission interface includes a digital interface, a power transmission interface or a combination thereof. The noise suppression circuit includes a plurality of noise suppression components and one or more coupling paths. The plurality of noise suppression components includes a first noise suppression component and a second noise suppression component. The first noise suppression component is connected to one or more transmission paths of the transmission interface. The second noise suppression component is connected to one or more transmission paths of the receiving interface. The first noise suppression component includes one or more signal input ports, one or more signal output ports and one or more coupling ports. Inside the first noise suppression component, the one or more signal output ports are connected to the one or more signal input ports of the first noise suppression component through the one or more transmission paths of the transmission interface. The one or more signal input ports of the first noise suppression component is connected to one part of the one or more transmission paths of the transmission interface outside the plurality of noise suppression components. The one or more signal output ports of the first noise suppression component is connected to another part of the one or more transmission paths of the transmission interface outside the plurality of noise suppression components. The first noise suppression component obtains or replicates part of or all of power from the one or more transmission paths of the transmission interface and outputs the power to the one or more coupling ports of the first noise suppression component. The second noise suppression component includes one or more signal input ports, one or more signal output ports and one or more coupling ports. The one or more signal output ports are connected to the one or more signal input ports of the second noise suppression component through the one or more transmission paths of the receiving interface inside the second noise suppression component. The one or more signal input ports of the second noise suppression component is connected to one part of the one or more transmission paths of the receiving interface outside the second noise suppression component. The one or more signal output ports of the second noise suppression component is connected to another part of the one or more transmission paths of the receiving interface outside the second noise suppression component. The second noise suppression component obtains or replicates part of or all of power from the one or more coupling ports of the second noise suppression component, and outputs the power to the one or more signal output ports of the second noise suppression component. The one or more coupling ports of the first noise suppression component are partly or completely connected to the one or more coupling ports of the second noise suppression component through the one or more coupling paths. One or more phase adjusting component is disposed on the one or more coupling paths for providing a predetermined phase at a predetermined frequency.

The noise suppression circuit of the present disclosure is applicable to various transmission interfaces and various receiving interfaces. The noise suppression circuit of the present disclosure is capable of eliminating or improving interference of signals or noise on the various transmission interfaces to the various receiving interfaces. The noise suppression circuit of the present disclosure has more flexibility than that of the conventional filter. For example, the noise suppression circuit of the present disclosure can be manufactured together with the transmission interface or the receiving interface. Therefore, production complexity such as the common simulation complexity and the co-design complexity is reduced, and cost of the noise suppression circuit of the present disclosure is reduced. The modularized structures can be adjusted according to actual situations to achieve a best condition of the noise suppression circuit of the present disclosure. Therefore, the noise suppression circuit of the present disclosure achieves an effect of more completely and efficiently eliminating the interference of the transmission interface to the receiving interface than that of the related art.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
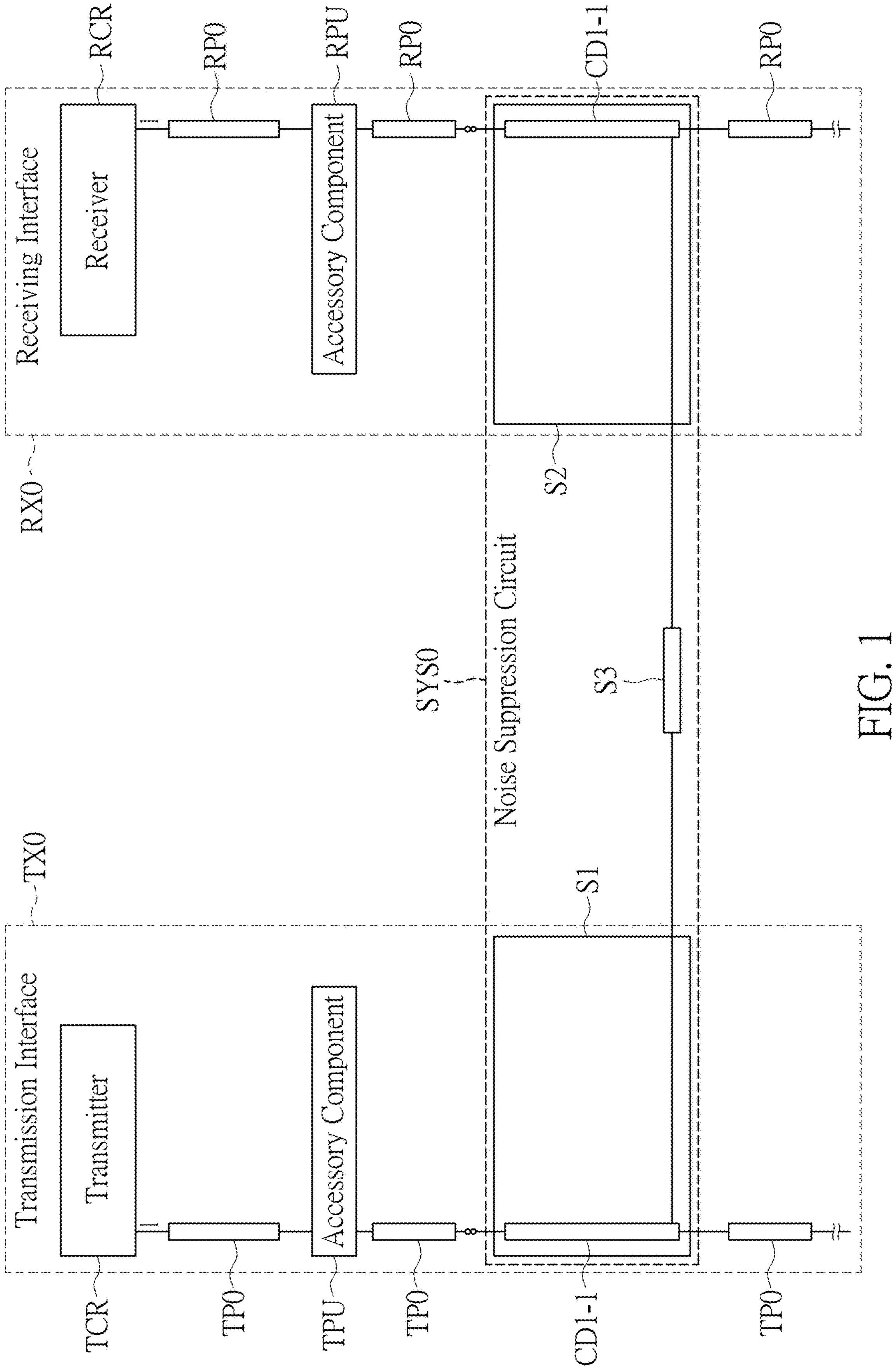
FIG. 1 is a schematic diagram of a noise suppression circuit disposed between a transmission interface and a receiving interface according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

It is worth noting that, in conventional applications, no noise suppression circuit is disposed between a digital interface and a receiving interface, and none is disposed between a power transmission interface and the receiving interface. A main technical feature of the present disclosure is that, the present disclosure provides a noise suppression circuit that is applicable between the digital interface and the receiving interface and/or between the power transmission interface and the receiving interface for suppressing noise in signals transmitted through the digital interface, the power transmission interface or both.

In the present disclosure, the transmission interface is used to transmit digital or analog signals including data or electric power. The signals on the transmission interface may be transmitted through accessory components such as, but not limited to, transmission lines, connectors, amplifiers or other components. The transmission interface at least includes one transmitter for processing the transmitted signal. The receiving interface may include various physical structures that are more diverse and complex than a common antenna for suppressing interference from the transmission interface to the receiving interface in an electronic device. The transmission interface of the present disclosure is defined as a non-wireless interface. On parts of transmission paths between an interface transmission terminal and a receiving terminal of the non-wireless interface, the signals are radiated through an antenna and then propagated in free space rather than being conducted through metal waveguide structures. For example, if Wi-Fi is used for transmission of the signals, the wireless interface may include a transmitter, a mixer, a RF front-end circuit, a filter and the antenna.

In the present disclosure, the receiving interface is used to receive digital or analog signals including data or electric power. The signals on the receiving interface may be transmitted through accessory components such as, but not limited to, transmission lines, connectors, amplifiers or other components. The receiving interface at least includes one receiver for processing the transmitted signal. Therefore, the receiving interface may include a digital interface, an analog transmission interface or a power transmission interface.

Different configurations of circuit components of the noise suppression circuit of the present disclosure are exemplified in different embodiments as described as follows, but the present disclosure is not limited thereto.

First Embodiment

Reference is made to FIG. 1, which is a schematic diagram of a noise suppression circuit disposed between a transmission interface and a receiving interface according to a first embodiment of the present disclosure.

It is worth noting that, as shown in FIG. 1, a noise suppression circuit SYS0 of the first embodiment of the present disclosure is disposed between a transmission interface TX0 and a receiving interface RX0. The transmission interface TX0 includes a digital interface, a power transmission interface or a combination thereof.

For example, if the transmission interface TX0 is the digital interface, the transmission interface TX0 may include a universal serial bus (USB), a high definition multimedia interface (HDMI), a PCI express (PCIE) interface, a serial ATA (SATA) interface, a mobile industry processor interface (MIPI), a Thunderbolt (TB) interface, a DisplayPort (DP) interface, a gigabit media independent interface (GMII), a network cable, or any combination thereof, but the present disclosure is not limited thereto.

For example, if the transmission interface TX0 is the power transmission interface, the transmission interface TX0 may include a power plane, a power distribution network, a power transmission line, or any combination thereof, but the present disclosure is not limited thereto.

One or more transmission interface signals on the transmission interface TX0 are transmitted through a transmission path TP0. One or more receiving interface signals on the receiving interface RX0 are transmitted through a transmission path RP0. The transmission interface TX0 includes a transmitter TCR and an accessory component TPU. The transmitter TCR and the accessory component TPU are disposed on the transmission path TP0 of the transmission interface TX0. The receiving interface RX0 includes a receiver RCR and an accessory component RPU. The receiver RCR and the accessory component RPU are disposed on the transmission path RP0 of the receiving interface RX0.

The transmission path TP0 is an independent physical path such as a power supply line or a telephone line and is used to transmit signals or power. The accessory component TPU may be disposed on the transmission path TP0. The accessory component TPU may include a transmission line, a resistor, a capacitor, an inductor, an amplifier, a filter, an oscillator, a mixer, etc. In practice, the plurality of transmission paths TP0 may be disposed, and the transmission interface signals transmitted on the plurality of transmission paths TP0 may be modulated by a system such as a differential transmission system or a three-phase circuit system. For example, if the two transmission paths TP0 are disposed, the transmission interface signals transmitted on the two transmission paths TP0 are differential signals, but common mode signals are usually considered noise.

The noise suppression circuit SYS0 includes a first noise suppression component S1 and a second noise suppression component S2.

The first noise suppression component S1 is connected to the transmission path TP0 of the transmission interface TX0.

The second noise suppression component S2 is connected to the receiving interface RX0 of the transmission path RP0.

The second noise suppression component S2 is connected to the first noise suppression component S1 through a phase adjusting component S3. The one or more transmission interface signals on the transmission interface TX0 are transmitted through the first noise suppression component S1, the phase adjusting component S3 and the second noise suppression component S2 to the receiving interface RX0 for suppressing interference from the transmission interface TX0 to the receiving interface RX0.

The first noise suppression component S1 includes a first conductor CD1-1. The first conductor CD1-1 of the first noise suppression component S1 is disposed on the transmission path TP0 on the transmission interface TX0. The first conductor CD1-1 is electrically connected to the phase adjusting component S3, or is electromagnetically coupled with the phase adjusting component S3.

The first conductor CD1-1 of the first noise suppression component S1 obtains some or all of the power from the transmitter TCR along the transmission path TP0, and then transmits the obtained power to the phase adjusting component S3. A phase of the power may be adjusted by the phase adjusting component S3. Then, the (adjusted) power is transmitted from the phase adjusting component S3 to the second noise suppression component S2.

The second noise suppression component S2 includes the first conductor CD1-1. The first conductor CD1-1 of the second noise suppression component S2 is connected to the transmission path RP0 of the receiving interface RX0 and the phase adjusting component S3. The first conductor CD1-1 of the second noise suppression component S2 obtains parts or all of the power of the first conductor CD1-1 of the first noise suppression component S1 from the phase adjusting component S3. Then, the power is transmitted to the receiver RCR along the transmission path RP0 of the receiving interface RX0.

The phase adjusting component S3 of the noise suppression circuit SYS0 includes a transmission medium having a specific physical length and an artificially synthesized delay circuit. The signals and noise are transmitted through the transmission medium and the artificially synthesized delay circuit. For example, the phase adjusting component S3 includes a transmission line (such as a coaxial cable, a twisted wire, a microstripline, stripline, coplanar waveguide, etc.), a phase synthesis circuit, a T-network, a Pi-network, a bridge circuit and a left-hand line, but the present disclosure is not limited thereto.

The first noise suppression component S1 and the second noise suppression component S2 may be specific physical structures or circuits. For example, each of the first noise suppression component S1 and the second noise suppression component S2 may include a branch-line coupler, a rat-race coupler, a couple-line coupler, a power divider, a circulator, sensor circuit, an amplifier or follower or any combination thereof. In addition, the first noise suppression component S1 and the second noise suppression component S2 may also be external structures combined with some original transmission structures of the transmission interface or the receiving interface. For example, a metal structure may be attached around a specific transmission line segment on a circuit board, and the attached metal structure and the specific transmission line segment together form the first noise suppression component S1 and the second noise suppression component S2.

In actual applications, the first noise suppression component S1 and the second noise suppression component S2 may be designed or manufactured together with the transmission interface TX0. An interface connected between the first noise suppression component S1 and the phase adjustment component S3, and an interface connected between the second noise suppression component S2 and the phase adjustment component S3 are reserved. For example, one or both of the first noise suppression component S1 and the second noise suppression component S2 of the present disclosure may be implemented with metal patterns on a circuit board where the transmission interface TX0 is located, or may be designed on a cable carrying the transmission interface TX0 to provide the same functions.

In other applications, the first noise suppression component S1 and the second noise suppression component S2 may be implemented in a composite manner. For example, the first noise suppression component S1 and the second noise suppression component S2 may be external structures attached or covered on the transmission interface TX0 or the receiving interface RX0. The first noise suppression component S1 and the second noise suppression component S2 may include the transmission interface TX0 or the receiving interface RX0, and the attached or covered external structures.

In addition, the first noise suppression component S1 and the second noise suppression component S2 of the noise suppression circuit SYS0 of the present disclosure may be independent structures, and may be connected to the transmission interface TX0 or the receiving interface RX0.

Second Embodiment

Figure 2:
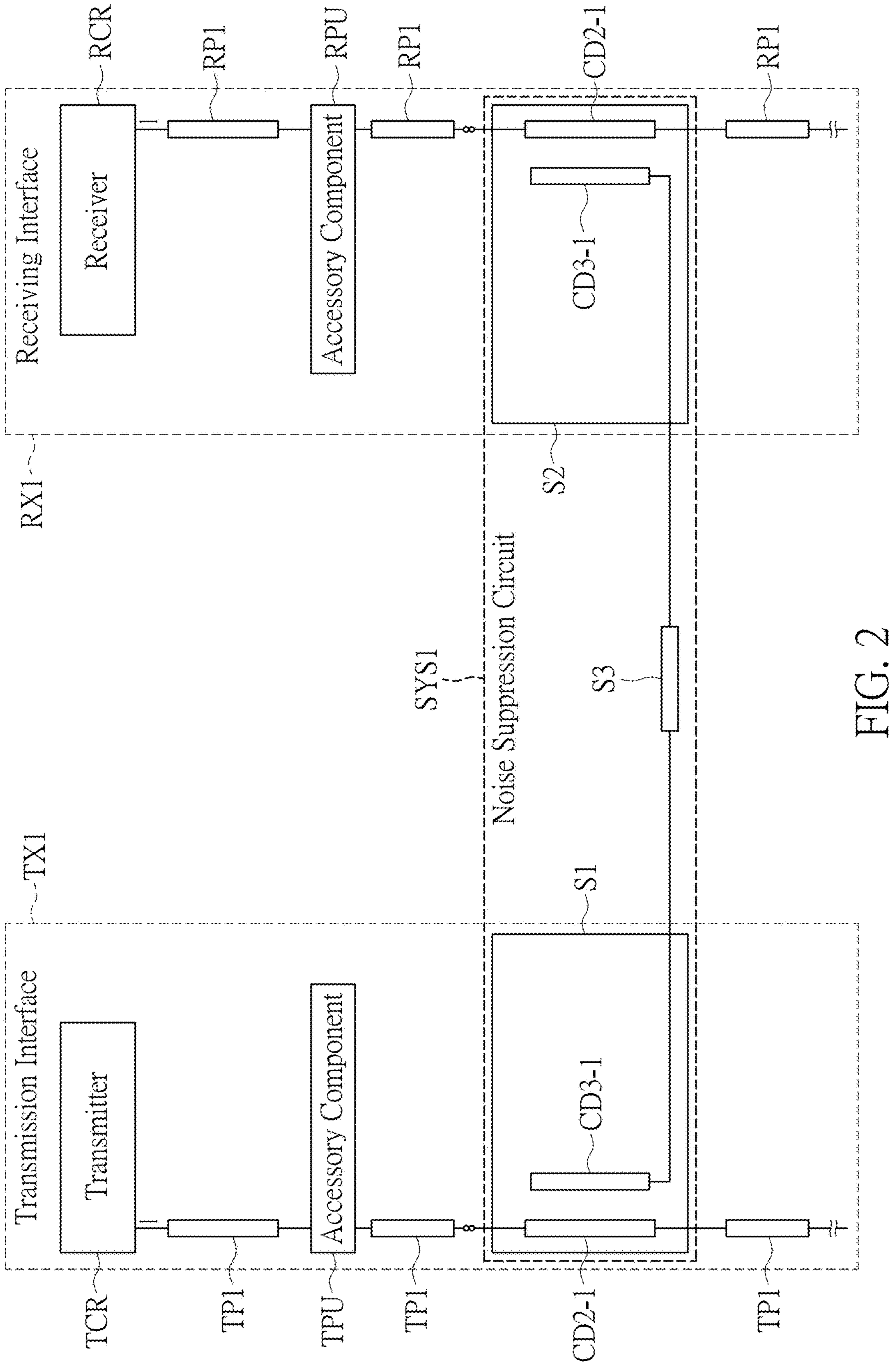
FIG. 2 is a first schematic diagram of a noise suppression circuit disposed between a transmission interface and a receiving interface according to a second embodiment of the present disclosure.

Reference is made to FIG. 2, which is a first schematic diagram of a noise suppression circuit disposed between a transmission interface and a receiving interface according to a second embodiment of the present disclosure.

It is worth noting that, as shown in FIG. 2, a noise suppression circuit SYS1 of a second embodiment of the present disclosure is disposed between a transmission interface TX1 and a receiving interface RX1. The transmission interface TX1 includes the digital interface, the power transmission interface or a combination thereof.

The descriptions of the noise suppression circuit SYS1 as shown in FIG. 2 that are the same as the descriptions of the noise suppression circuit SYS0 as shown in FIG. 1 are not repeated herein.

One difference between the noise suppression circuit SYS1 as shown in FIG. 2 and the noise suppression circuit SYS0 as shown in FIG. 1 is that, the noise suppression circuit SYS1 as shown in FIG. 2 not only includes a second conductor CD2-1, but also includes a third conductor CD3-1.

The second conductor CD2-1 of the noise suppression circuit SYS1 is disposed on a transmission path TP1 of the transmission interface TX1. In the first noise suppression component S1, the third conductor CD3-1 is disposed at one side of the second conductor CD2-1, and is electromagnetically coupled with the second conductor CD2-1. In the first noise suppression component S1, the third conductor CD3-1 obtains parts or all of power transmitted onto the second conductor CD2-1, or the second conductor CD2-1 obtains parts or all of power transmitted onto the third conductor CD3-1. The third conductor CD3-1 of the first noise suppression component S1 is electrically connected to the phase adjusting component S3, or is electromagnetically coupled with the phase adjusting component S3. Parts or all of the power on the transmission path TP1 is transmitted sequentially through the second conductor CD2-1 of the first noise suppression component S1, the third conductor CD3-1 of the first noise suppression component S1 and the phase adjusting component S3 to the second noise suppression component S2.

The electromagnetic coupling is realized by distributed capacitors. For example, components used for realizing the electromagnetic field coupling may include capacitors, metal plates, transistors, diodes and other structures.

The electromagnetic coupling is a phenomenon in which an electromotive force is caused by a change in a current of an adjacent conductor. For example, components for realizing the electromagnetic coupling may include an inductor, a coupled-line, a magnetically permeable structure or other structures.

Another difference between the noise suppression circuit SYS1 as shown in FIG. 2 and the noise suppression circuit SYS0 as shown in FIG. 1 is that, the second noise suppression component S2 as shown in FIG. 2 not only includes the second conductor CD2-1, but also includes the third conductor CD3-1.

The second conductor CD2-1 of the second noise suppression component S2 is disposed on a transmission path RP1 of the receiving interface RX1. In the second noise suppression component S2, the third conductor CD3-1 is disposed at one side of the second conductor CD2-1, and the second conductor CD2-1 obtains parts or all of power transmitted onto the third conductor CD3-1.

Figure 3:
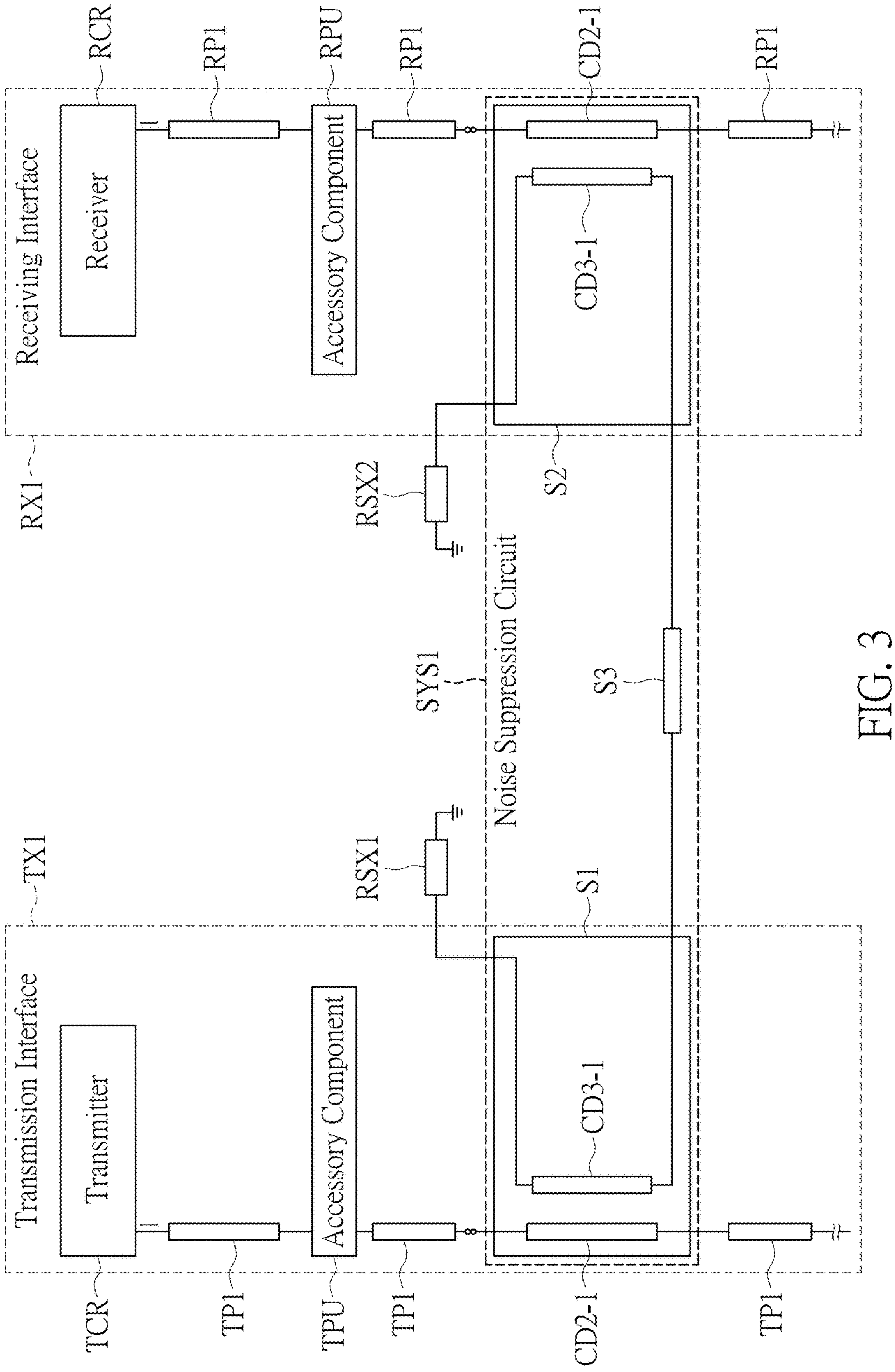
FIG. 3 is a second schematic diagram of the noise suppression circuit disposed between the transmission interface and the receiving interface according to the second embodiment of the present disclosure.

Reference is made to FIG. 3, which is a second schematic diagram of the noise suppression circuit disposed between the transmission interface and the receiving interface according to the second embodiment of the present disclosure.

It is worth noting that, as shown in FIG. 3, the noise suppression circuit SYS1 of the second embodiment of the present disclosure is disposed between the transmission interface TX1 and the receiving interface RX1. The transmission interface TX1 includes the digital interface, the power transmission interface or a combination thereof.

The descriptions of the noise suppression circuit SYS1 as shown in FIG. 3 that are the same as the descriptions of the noise suppression circuit SYS1 as shown in FIG. 2 are not repeated herein.

One difference between the noise suppression circuit SYS1 as shown in FIG. 3 and the noise suppression circuit SYS1 as shown in FIG. 2 is that, the third conductor CD3-1 of the first noise suppression component S1 is further connected to an impedance component RSX1 as shown in FIG. 3, and the third conductor CD3-1 of the second noise suppression component S2 is further connected to an impedance component RSX2 as shown in FIG. 3.

Each of the impedance components RSX1 and RSX2 may include a resistor, a capacitor, an inductor, a transmission wire, or any combination thereof.

Figure 4:
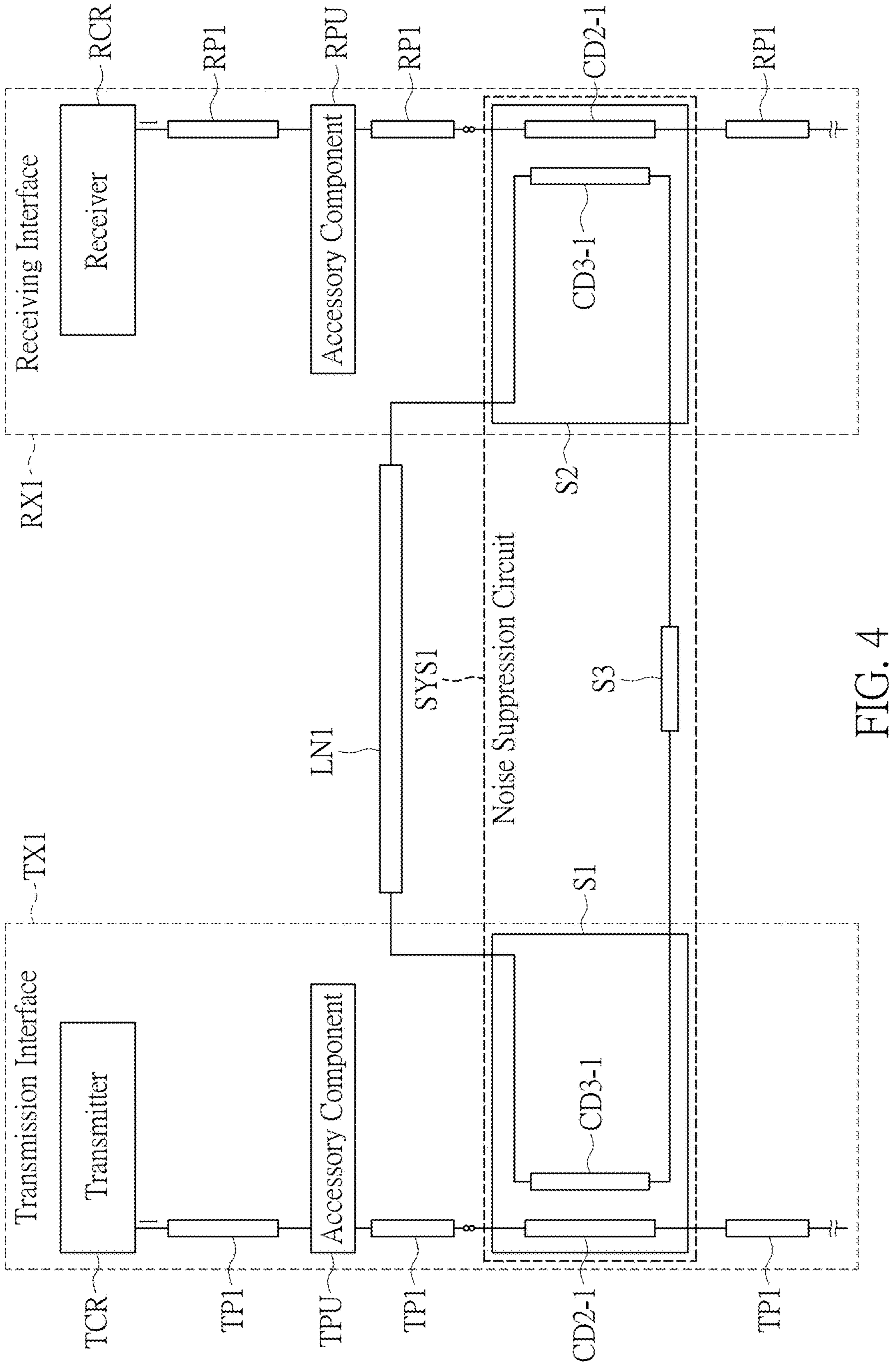
FIG. 4 is a third schematic diagram of the noise suppression circuit disposed between the transmission interface and the receiving interface according to the second embodiment of the present disclosure.

Reference is made to FIG. 4, which is third schematic diagram of the noise suppression circuit disposed between the transmission interface and the receiving interface according to the second embodiment of the present disclosure.

The descriptions of the noise suppression circuit SYS1 as shown in FIG. 4 that are the same as the descriptions of the noise suppression circuit SYS1 as shown in FIG. 2 are not repeated herein.

It is worth noting that, as shown in FIG. 4, the noise suppression circuit SYS1 of the second embodiment of the present disclosure is disposed between the transmission interface TX1 and the receiving interface RX1. The transmission interface TX1 includes the digital interface, the power transmission interface or a combination thereof.

As shown in FIG. 4, on one coupling path, the third conductor CD3-1 of the first noise suppression component S1 is connected to the third conductor CD3-1 of the second noise suppression component S2 through the phase adjusting component S3. On another coupling path, the third conductor CD3-1 of the first noise suppression component S1 is connected to the third conductor CD3-1 of the second noise suppression component S2 through a connection wire LN1 as a phase adjusting component.

Third Embodiment

Figure 5:
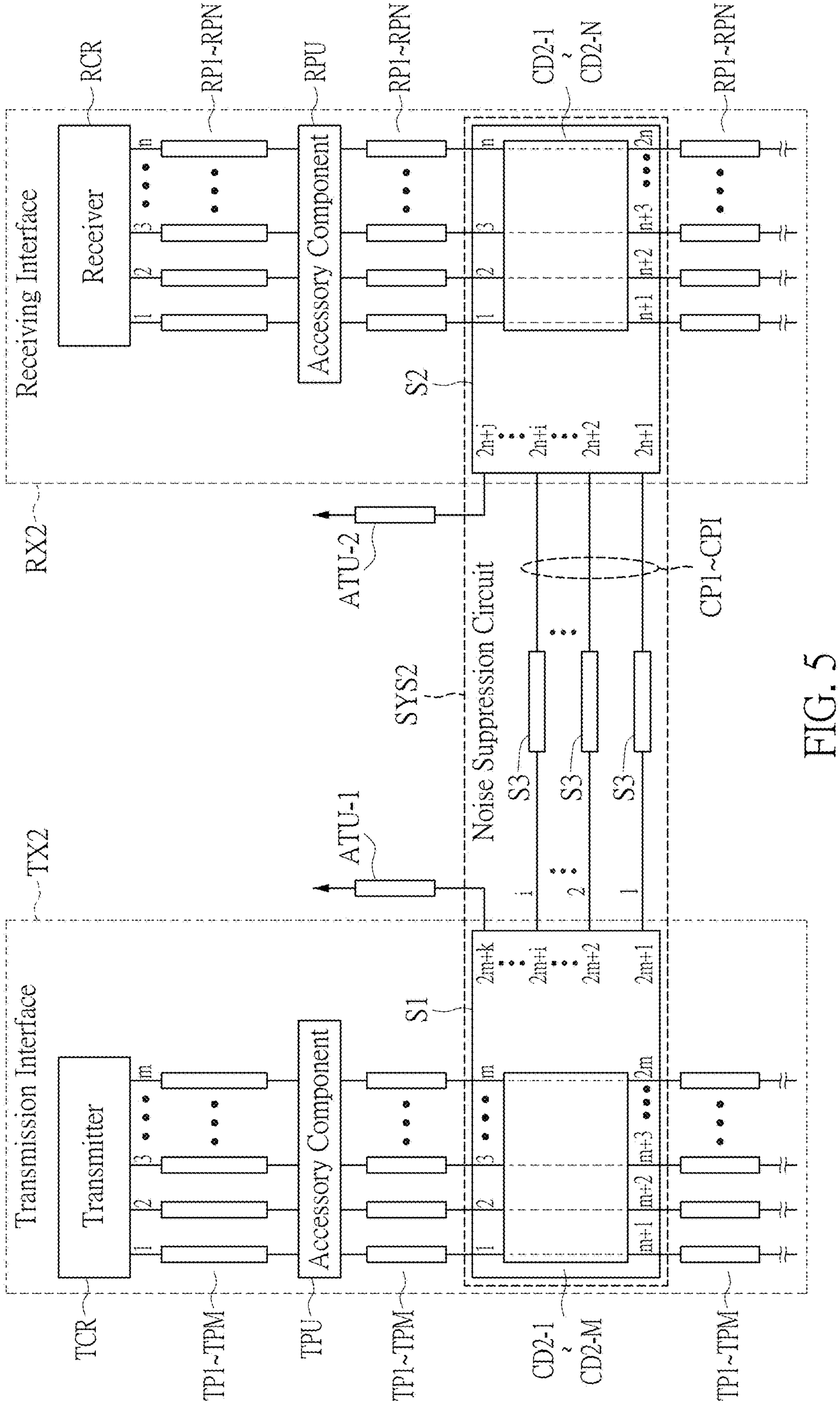
FIG. 5 is a first schematic diagram of a noise suppression circuit disposed between a transmission interface and a receiving interface according to a third embodiment of the present disclosure.

Reference is made to FIG. 5, which is a first schematic diagram of a noise suppression circuit disposed between a transmission interface and a receiving interface according to a third embodiment of the present disclosure.

It is worth noting that, as shown in FIG. 5, a noise suppression circuit SYS2 of the third embodiment of the present disclosure is disposed between a transmission interface TX2 and a receiving interface RX2. The transmission interface TX2 includes the digital interface, the power transmission interface or a combination thereof.

Differences between the third embodiment and the first and second embodiments of the present disclosure are described as follows.

In the third embodiment, the noise suppression circuit SYS2 of the present disclosure is configured to eliminate interference from the transmission interface TX2 to the receiving interface RX2.

The noise suppression circuit SYS2 includes the first noise suppression component S1 and the second noise suppression component S2. The transmission interface TX2 includes the transmitter TCR and the accessory component TPU. The transmitter TCR and the accessory component TPU are disposed on a plurality of transmission paths TP1 to TPM. The receiving interface RX2 includes the receiver RCR and the accessory component RPU. The receiver RCR and the accessory component RPU are disposed on m transmission paths RP1 to RPN.

The first noise suppression component S1 is disposed on the plurality of transmission paths TP1 to TPM of the transmission interface TX2. The second noise suppression component S2 is disposed on n transmission paths RP1 to RPN of the receiving interface RX2.

The first noise suppression component S1 includes 2m+k coupling ports, wherein k>=1 and m>=1. Inside the first noise suppression component S1, 1st to mth signal input ports of the first noise suppression component S1 are connected respectively to (m+1)th to (2m)th signal output ports of the first noise suppression component S1. Outside the first noise suppression component S1, the 1st to mth signal input ports of the first noise suppression component S1 are connected respectively to the mth transmission paths TP1 to TPM at one side of the first noise suppression component S1 of the transmission interface TX2. Outside the first noise suppression component S1, the (m+1)th to (2m)th signal output ports of the first noise suppression component S1 are connected respectively to the m transmission paths TP1 to TPM at another side of the first noise suppression component S1 of the transmission interface TX2. The first noise suppression component S1 obtains parts or all of power transmitted on the m transmission paths TP1 to TPM, and outputs the power through the (2m+1)th to (2m+k)th coupling ports of the first noise suppression component S1. One or more of the (2m+i+1)th to the (2m+k)th coupling ports are connected to other interfaces through a path ATU-1.

The second noise suppression component S2 includes (2n+j)th coupling ports, wherein j>=1 and n>=1. Inside the second noise suppression component S2, 1st to nth signal output ports of the second noise suppression component S2 are connected respectively to (n+1)th to (2n)th signal input ports of the second noise suppression component S2 through n second conductors CD2-1 to CD2-N. Outside the second noise suppression component S2, the 1st to nth signal output ports of the second noise suppression component S2 are connected respectively to the n transmission paths RP1 to RPN at one side of the second noise suppression component S2 of the receiving interface RX2. Outside the second noise suppression component S2, the (n+1)th to (2n)th signal input ports of the second noise suppression component S2 are connected respectively to the n transmission paths RP1 to RPN at another side of the second noise suppression component S2 of the receiving interface RX2. The second noise suppression component S2 may receive or replicate parts or all of power at (2n+1)th to (2n+j)th coupling ports of the second noise suppression component S2, and outputs the power through the (1)th to (2n)th input ports of the second noise suppression component S2. One or more of the (2n+i+1)th to (2n+j)th coupling ports of the second noise suppression component S2 may be connected to other interfaces through a path ATU-2.

The first noise suppression component S1 may be connected to the second noise suppression component S2 through i coupling paths CP1 to CPI, in which i may be equal to or larger than 1. The noise suppression circuit SYS2 of the present disclosure at least includes the phase adjusting component S3 on each of the coupling paths CP1 to CPI for providing a predetermined phase at a predetermined frequency.

As shown in FIG. 5, the second conductors CD2-1 to CD2-M are disposed inside the first noise suppression component S1. The second conductors CD2-1 to CD2-M are electrically connected to the (2m+1)th to (2m+k)th coupling ports of the first noise suppression component S1, or are electromagnetically coupled with the (2m+1)th to (2m+k)th coupling ports of the first noise suppression component S1.

The second conductors CD2-1 to CD2-N are disposed inside the second noise suppression component S2. The second conductors CD2-1 to CD2-N are electrically connected to the (2n+1)th to (2n+j)th coupling ports of the second noise suppression component S2, or are electromagnetically coupled with the (2n+1)th to (2n+j)th coupling ports of the second noise suppression component S2.

Direct current (DC) signals such as DC voltages or DC currents may be coupled or transmitted between the (−2m+1)th to (2m+k)th coupling ports and the (2n+1)th to (2n+j)th coupling ports.

One or more of the second conductors CD2-1 to CD2-M may be electromagnetically coupled with one or more of the (2m+1)th to (2m+k)th coupling ports caused by one or more capacitors. One or more of the second conductors CD2-1 to CD2-N may be electromagnetically coupled with one or more of the (2n+1)th to (2n+j)th coupling ports.

Figure 6:
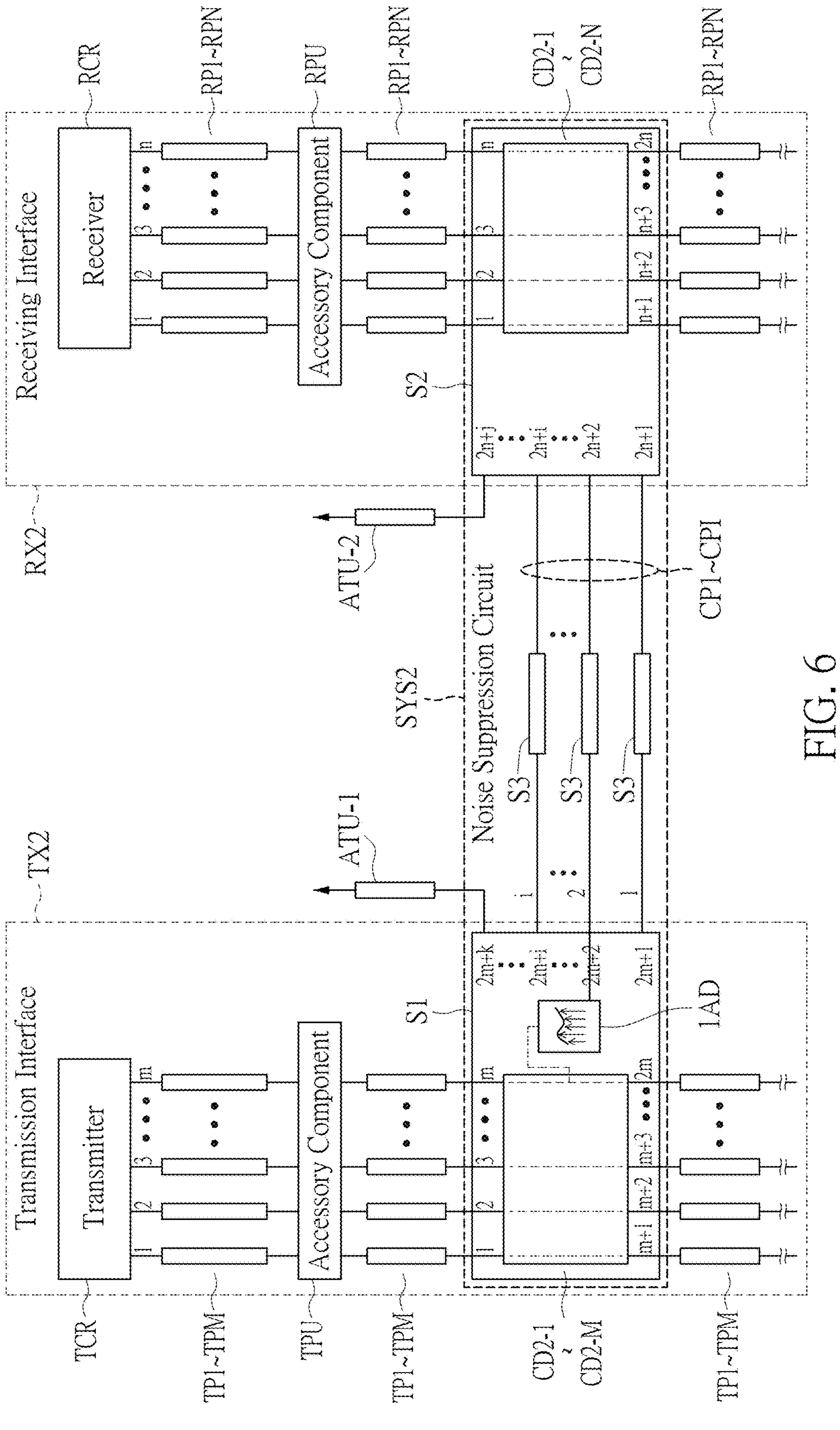
FIG. 6 is a second schematic diagram of the noise suppression circuit disposed between the transmission interface and the receiving interface according to the third embodiment of the present disclosure.

Reference is made to FIG. 6, which is a second schematic diagram of the noise suppression circuit disposed between the transmission interface and the receiving interface according to the third embodiment of the present disclosure.

It is worth noting that, as shown in FIG. 6, the noise suppression circuit SYS2 is disposed between the transmission interface TX2 and the receiving interface RX2. The transmission interface TX2 includes the digital interface, the power transmission interface or a combination thereof.

A difference between the noise suppression circuit SYS2 as shown in FIG. 6 and the noise suppression circuit SYS2 as shown in FIG. 5 is that, in the first noise suppression component S1 of the noise suppression circuit SYS2 as shown in FIG. 6, a sensor 1AD senses signals and noise of one or more of the second conductors CD2-1 to CD2-M to generate a sense result, and outputs the sense result to one or more of the (2m+1)th to (2m+k)th coupling ports of the first noise suppression component S1.

Figure 7:
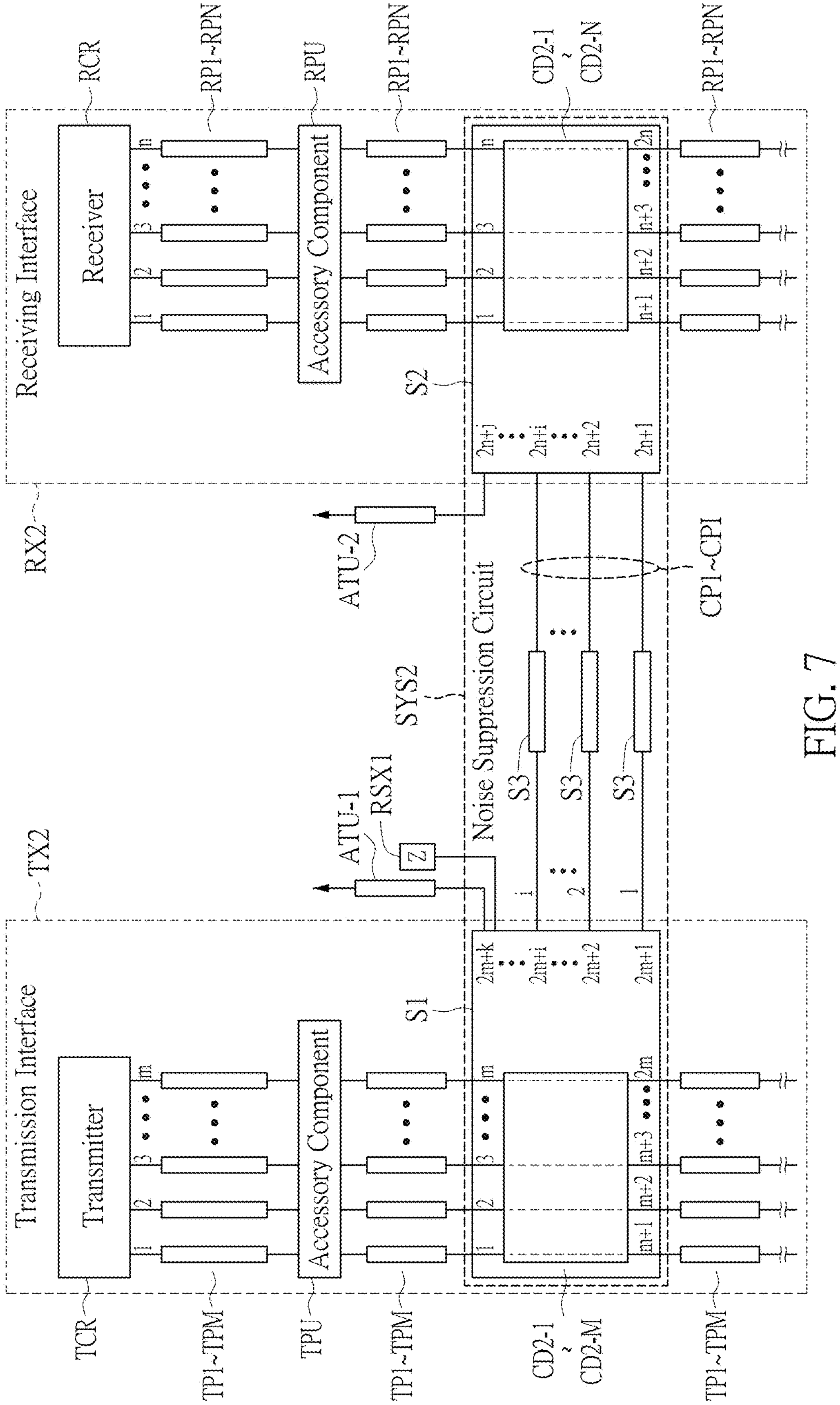
FIG. 7 is a third schematic diagram of the noise suppression circuit disposed between the transmission interface and the receiving interface according to the third embodiment of the present disclosure.

Reference is made to FIG. 7, which is a third schematic diagram of the noise suppression circuit disposed between the transmission interface and the receiving interface according to the third embodiment of the present disclosure.

It is worth noting that, as shown in FIG. 7, the noise suppression circuit SYS2 is disposed between the transmission interface TX2 and the receiving interface RX2. The transmission interface TX2 includes the digital interface, the power transmission interface or a combination thereof.

A difference between the noise suppression circuit SYS2 as shown in FIG. 7 and the noise suppression circuit SYS2 as shown in FIG. 5 is that, in the first noise suppression component S1 of the noise suppression circuit SYS2 as shown in FIG. 7, the (2m+i+1)th to (2m+k)th coupling ports of the first noise suppression component S1 are connected to the impedance component RSX1 as the terminal load. In practice, the (2n+i+1)th to (2n+j)th coupling ports of the second noise suppression component S2 may also be connected to an impedance component as the terminal load.

Figure 8:
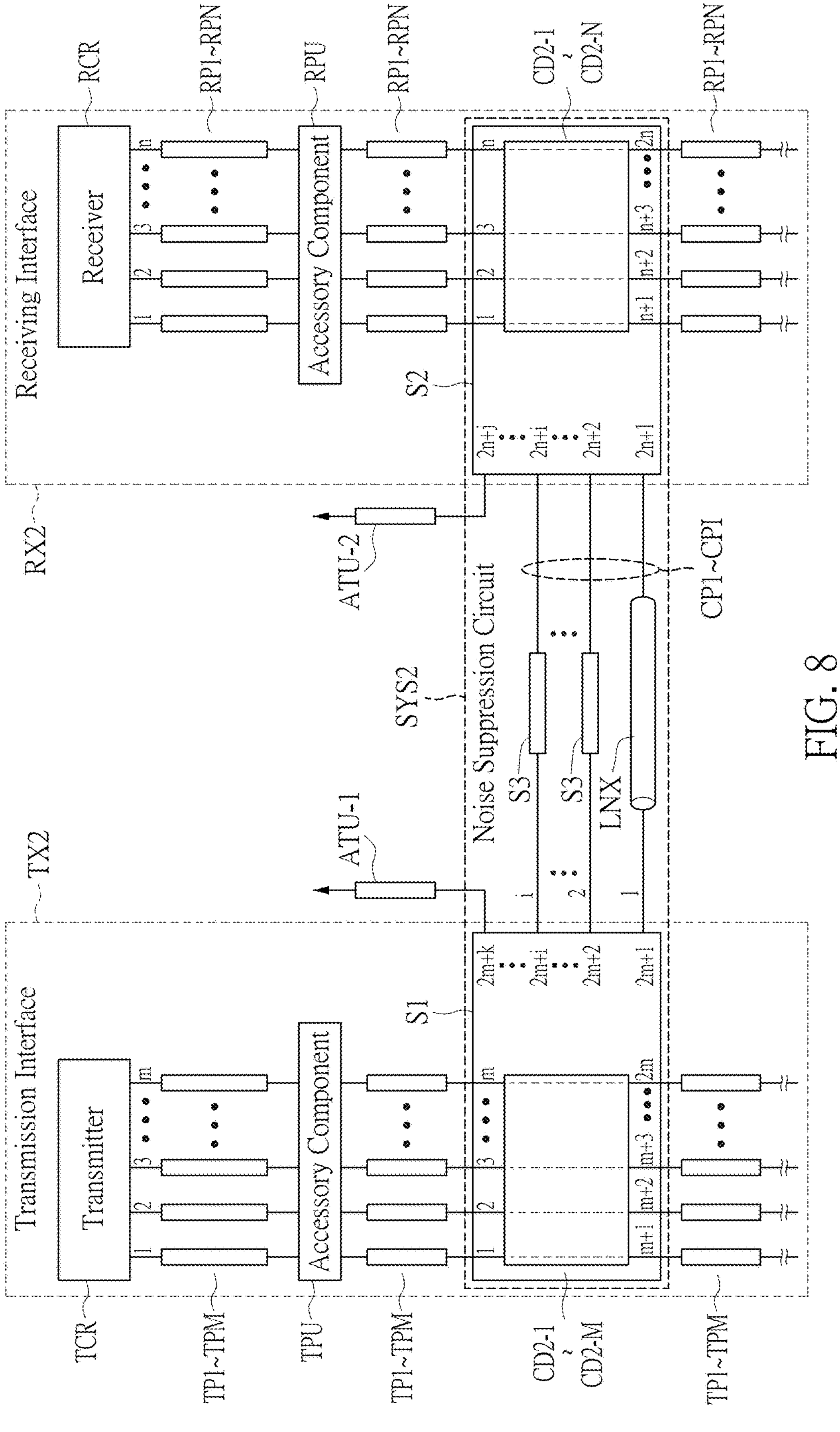
FIG. 8 is a fourth schematic diagram of the noise suppression circuit disposed between the transmission interface and the receiving interface according to the third embodiment of the present disclosure.

Reference is made to FIG. 8, which is a fourth schematic diagram of the noise suppression circuit disposed between the transmission interface and the receiving interface according to the third embodiment of the present disclosure.

It is worth noting that, as shown in FIG. 8, the noise suppression circuit SYS2 is disposed between the transmission interface TX2 and the receiving interface RX2. The transmission interface TX2 includes the digital interface, the power transmission interface or a combination thereof.

A difference between the noise suppression circuit SYS2 as shown in FIG. 8 and the noise suppression circuit SYS2 as shown in FIG. 5 is that, the noise suppression circuit SYS2 as shown in FIG. 8 includes one or more transmission line LNX having a specific length for providing the predetermined phase at the predetermined frequency. The transmission line LNX is connected between the (2m+1)th coupling port of the first noise suppression component S1 and the (2n+1)th coupling port of the second noise suppression component S2.

Figure 9:
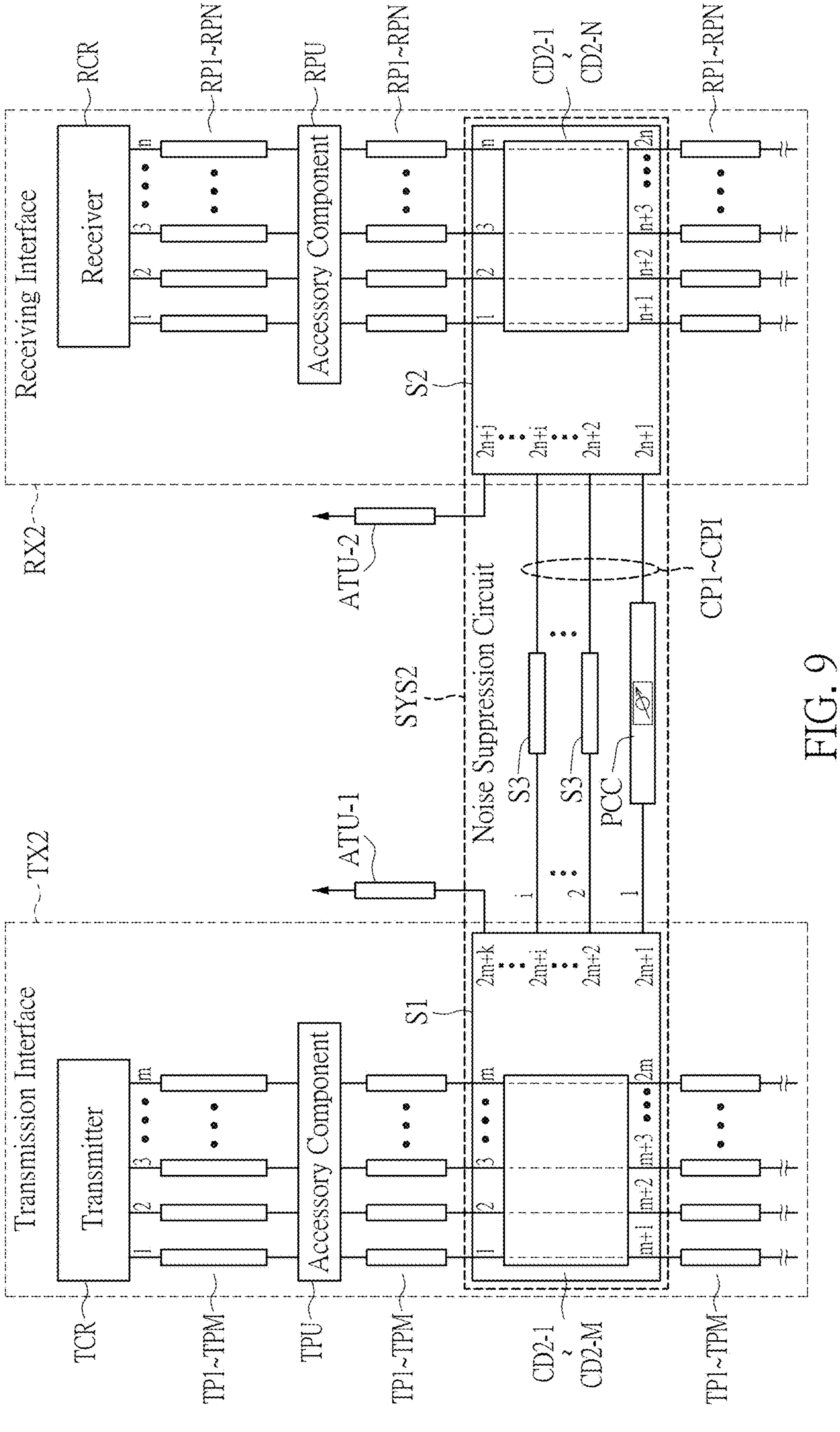
FIG. 9 is a fifth schematic diagram of the noise suppression circuit disposed between the transmission interface and the receiving interface according to the third embodiment of the present disclosure.

Reference is made to FIG. 9, which is a fifth schematic diagram of the noise suppression circuit disposed between the transmission interface and the receiving interface according to the third embodiment of the present disclosure.

It is worth noting that, as shown in FIG. 9, the noise suppression circuit SYS2 is disposed between the transmission interface TX2 and the receiving interface RX2. The transmission interface TX2 includes the digital interface, the power transmission interface or a combination thereof.

A difference between the noise suppression circuit SYS2 as shown in FIG. 9 and the noise suppression circuit SYS2 as shown in FIG. 5 is that, the phase adjusting component S3 of the noise suppression circuit SYS2 as shown in FIG. 9 includes a phase synthesis circuit PCC for providing the predetermined phase at the predetermined frequency. The phase synthesis circuit PCC may be connected to the (2m+1)th coupling port of the first noise suppression component S1 and the (2n+1)th coupling port of the second noise suppression component S2.

Figure 10:
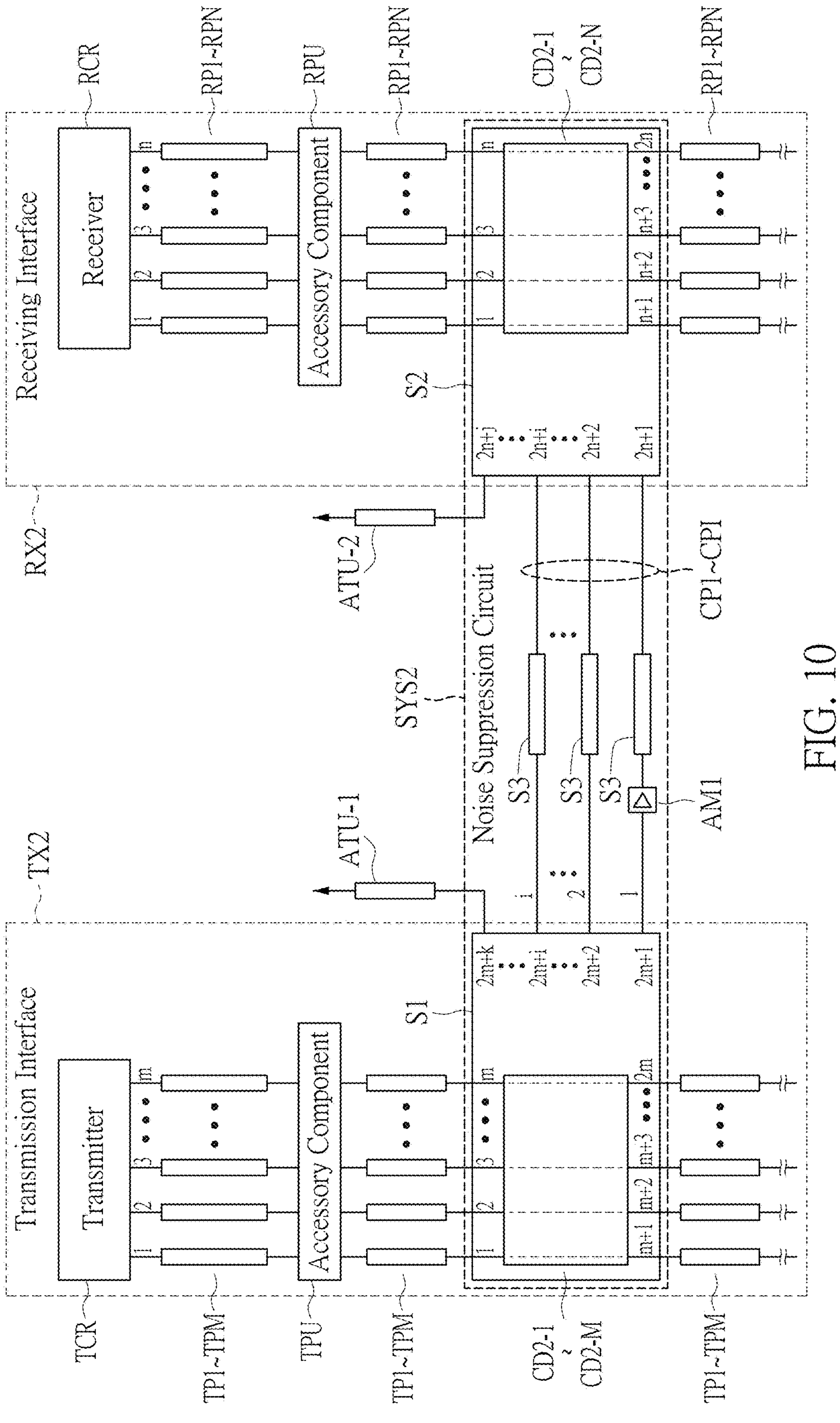
FIG. 10 is a sixth schematic diagram of the noise suppression circuit disposed between the transmission interface and the receiving interface according to the third embodiment of the present disclosure.

Reference is made to FIG. 10, which is a sixth schematic diagram of the noise suppression circuit disposed between the transmission interface and the receiving interface according to the third embodiment of the present disclosure.

It is worth noting that, as shown in FIG. 10, the noise suppression circuit SYS2 is disposed between the transmission interface TX2 and the receiving interface RX2. The transmission interface TX2 includes the digital interface, the power transmission interface or a combination thereof.

A difference between the noise suppression circuit SYS2 as shown in FIG. 10 and the noise suppression circuit SYS2 as shown in FIG. 5 is that, the noise suppression circuit SYS2 as shown in FIG. 10 includes one or more intensity adjusting circuit AM1 on one or more of the plurality of coupling paths CP1 to CPI for adjusting power transmitted on one or more of the plurality of coupling paths CP1 to CPI at the predetermined frequency. The intensity adjusting circuit AM1 may include an attenuator or an amplifier.

When the intensity adjusting circuit AM1 is the attenuator, the intensity adjusting circuit AM1 may reflect or convert parts of the power transmitted on the one or more of the plurality of coupling paths CP1 to CPI into heat power at the predetermined frequency.

When the intensity adjusting circuit AM1 is the amplifier, the intensity adjusting circuit AM1 may amplify the power transmitted on the one or more of the plurality of coupling paths CP1 to CPI at the predetermined frequency.

Figure 11:
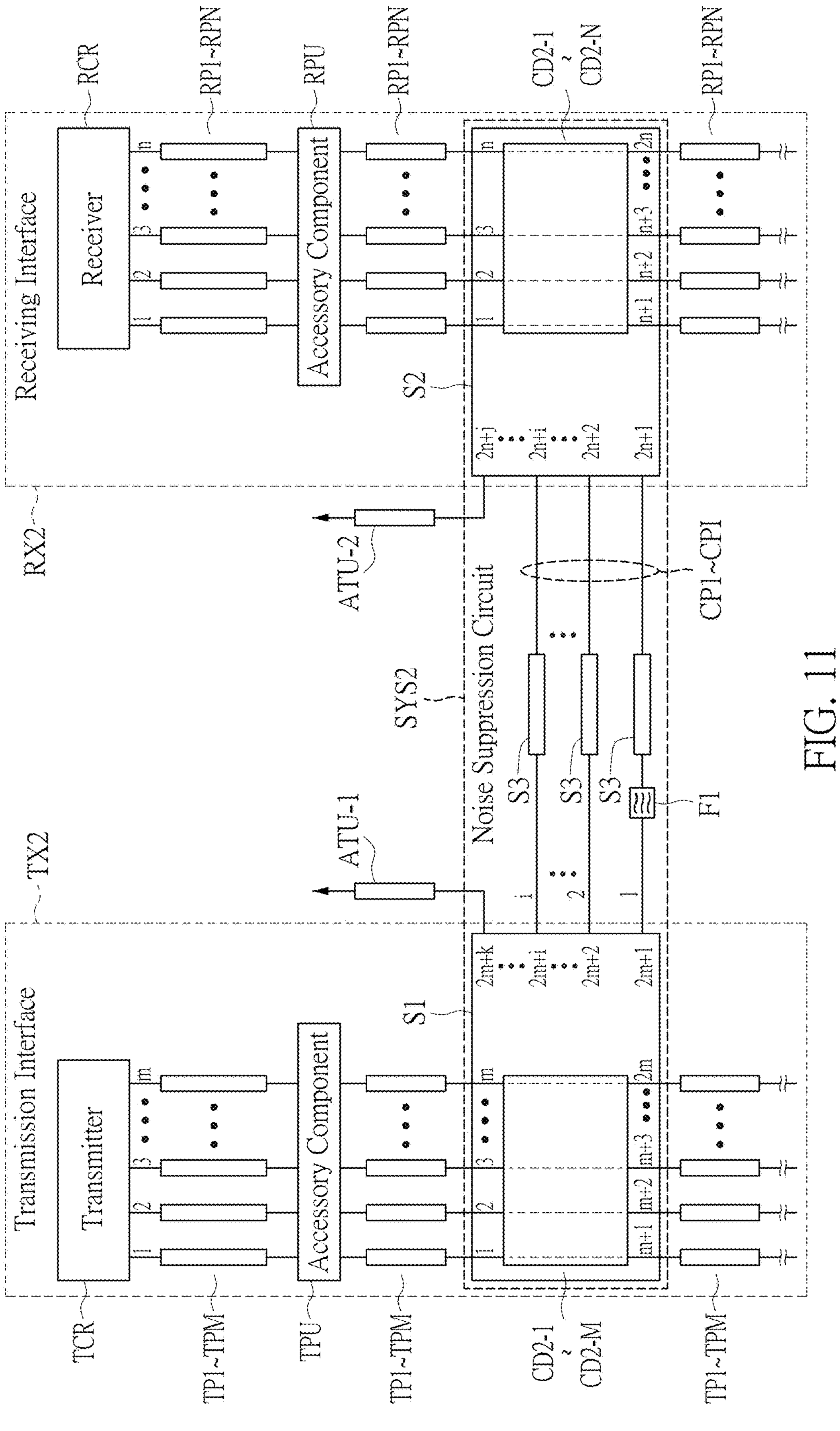
FIG. 11 is a seventh schematic diagram of the noise suppression circuit disposed between the transmission interface and the receiving interface according to the third embodiment of the present disclosure.

Reference is made to FIG. 11, which is a seventh schematic diagram of the noise suppression circuit disposed between the transmission interface and the receiving interface according to the third embodiment of the present disclosure.

It is worth noting that, as shown in FIG. 11, the noise suppression circuit SYS2 is disposed between the transmission interface TX2 and the receiving interface RX2. The transmission interface TX2 includes the digital interface, the power transmission interface or a combination thereof.

A difference between the noise suppression circuit SYS2 as shown in FIG. 11 and the noise suppression circuit SYS2 as shown in FIG. 5 is that, the noise suppression circuit SYS2 as shown in FIG. 11 includes one or more filter circuit F1 on one or more of the plurality of coupling paths CP1 to CPI.

Figure 12:
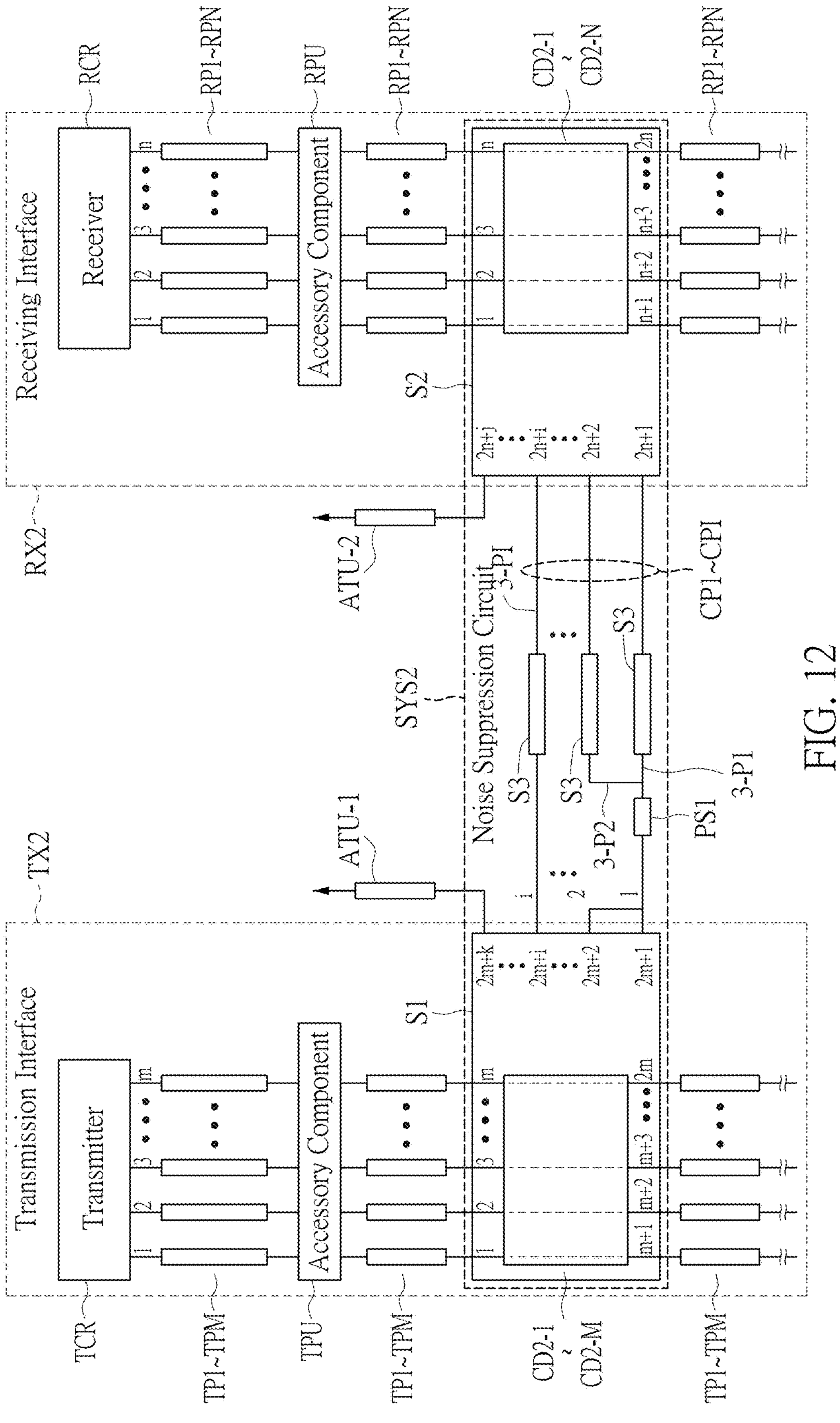
FIG. 12 is an eighth schematic diagram of the noise suppression circuit disposed between the transmission interface and the receiving interface according to the third embodiment of the present disclosure.

Reference is made to FIG. 12, which is an eighth schematic diagram of the noise suppression circuit disposed between the transmission interface and the receiving interface according to the third embodiment of the present disclosure.

It is worth noting that, as shown in FIG. 12, the noise suppression circuit SYS2 is disposed between the transmission interface TX2 and the receiving interface RX2. The transmission interface TX2 includes the digital interface, the power transmission interface or a combination thereof.

A difference between the noise suppression circuit SYS2 as shown in FIG. 9 and the noise suppression circuit SYS2 as shown in FIG. 5 is that, in the noise suppression circuit SYS2 as shown in FIG. 9, a physical structure PS1 is used on some of the plurality of coupling paths CP1 to CPI such as the coupling paths CP1 and CP2.

Figure 13:
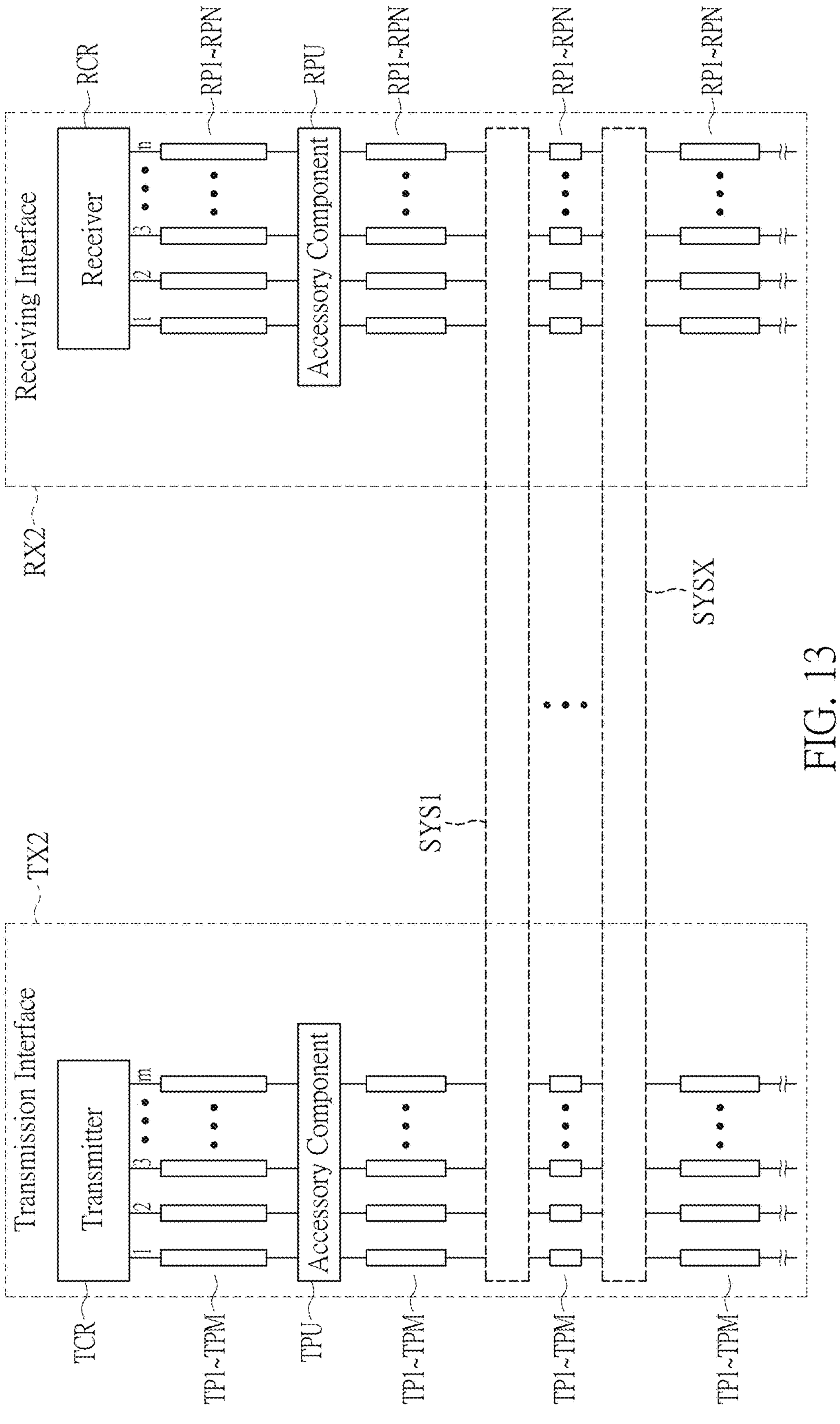
FIG. 13 is a ninth schematic diagram of the noise suppression circuit disposed between the transmission interface and the receiving interface according to the third embodiment of the present disclosure.

Reference is made to FIG. 13, which is a ninth schematic diagram of the noise suppression circuit disposed between the transmission interface and the receiving interface according to the third embodiment of the present disclosure.

It is worth noting that, as shown in FIG. 13, the plurality of noise suppression circuits SYS1 to SYSX are disposed between the transmission interface TX2 and the receiving interface RX2. The transmission interface TX2 includes the digital interface, the power transmission interface or a combination thereof.

As shown in FIG. 1 to FIG. 12, only the single noise suppression circuit SYS0, SYS1 or SYS2 is disposed. In contrast, as shown in FIG. 13, the plurality of noise suppression circuit SYS1 to SYSX are connected between the transmission interface TX2 and the receiving interface RX2.

Fourth Embodiment

Figure 15:
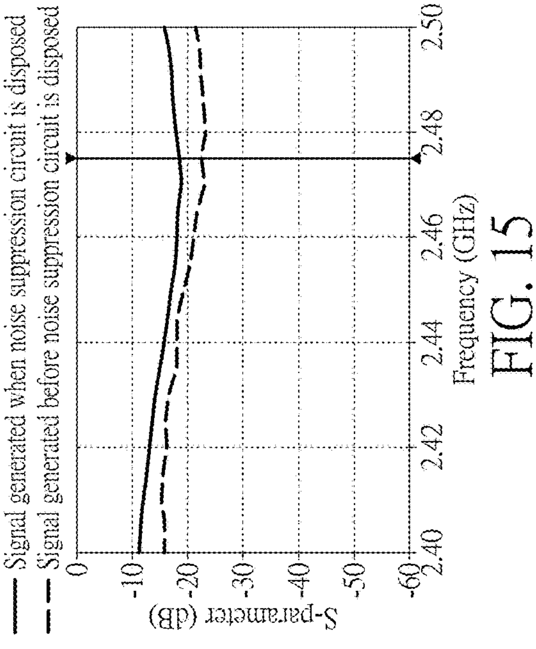
FIG. 15 is a S-parameter response of signals of a single port of the receiving interface (that is, an antenna) when and before the noise suppression circuit of the fourth embodiment of the present disclosure is disposed between the transmission interface (that is, a connector) and the receiving interface.
Figure 16:
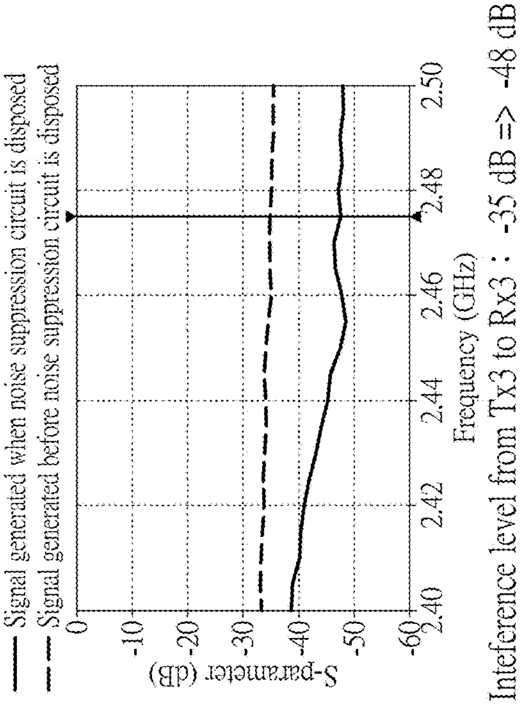
FIG. 16 is a S-parameter response of signals transmitted from the transmission interface to the receiving interface when and before the noise suppression circuit of the fourth embodiment of the present disclosure is disposed between the transmission interface and the receiving interface.
Figure 14:
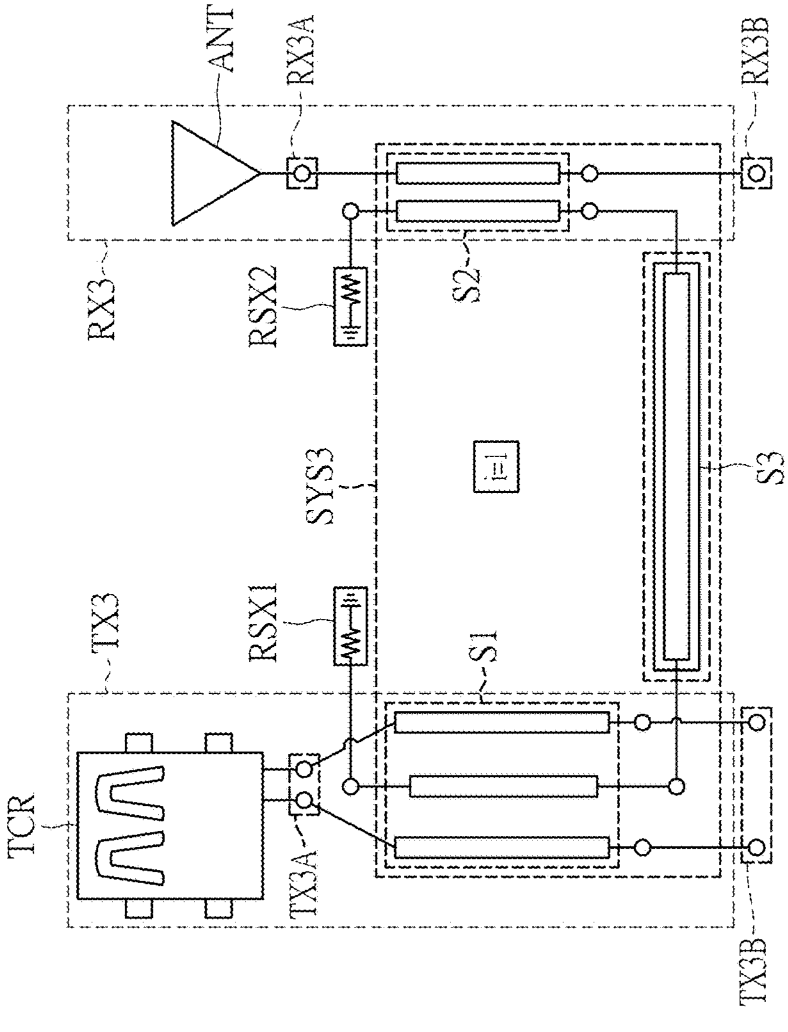
FIG. 14 is a schematic diagram of a noise suppression circuit disposed between a transmission interface and a receiving interface according to a fourth embodiment of the present disclosure.
Figure 17:
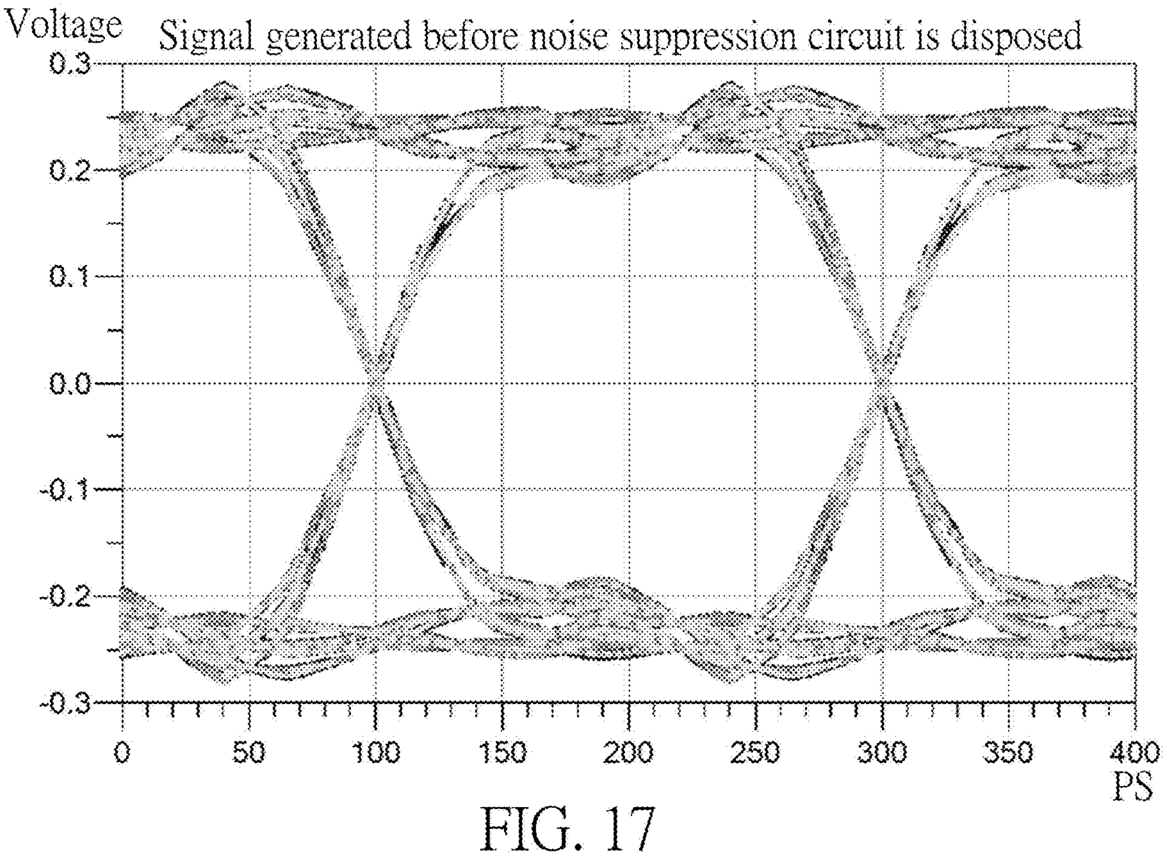
FIG. 17 is a schematic diagram showing quality of a signal that is transmitted on the transmission interface before the noise suppression circuit of the fourth embodiment of the present disclosure is disposed between the transmission interface and the receiving interface.
Figure 18:
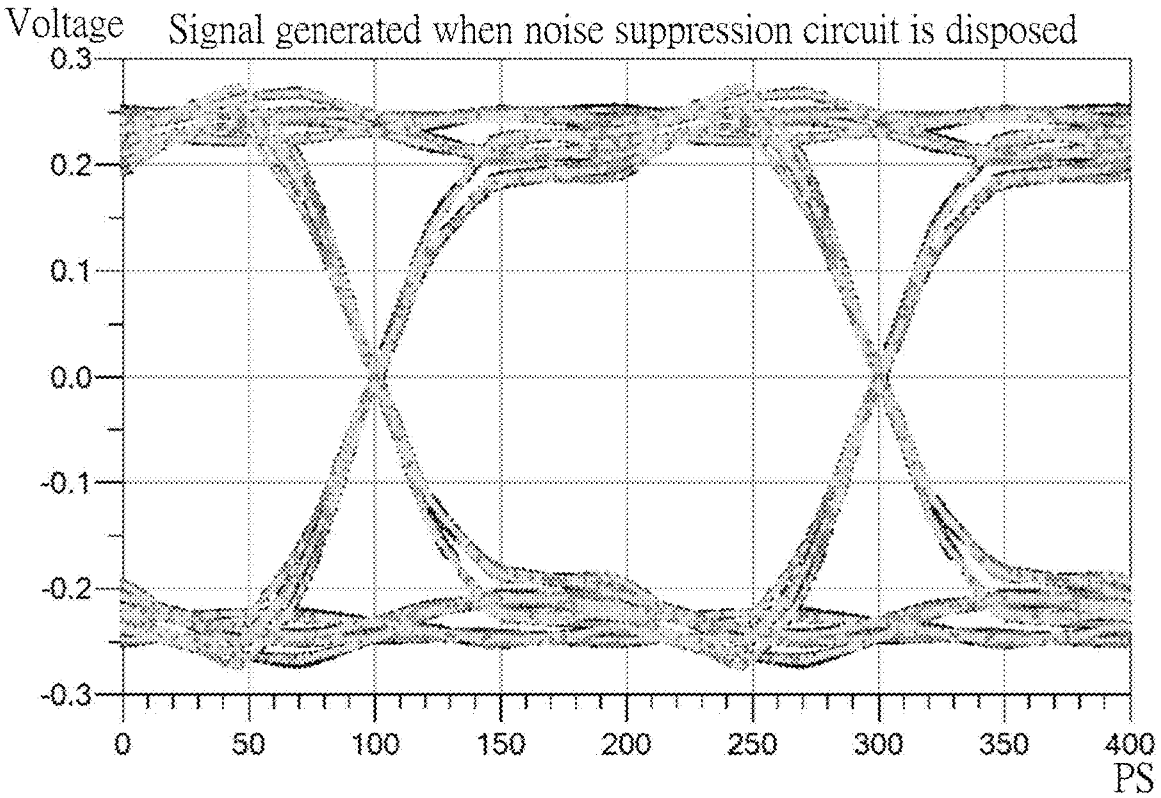
FIG. 18 is a schematic diagram showing quality of a signal that is transmitted on the transmission interface when the noise suppression circuit of the fourth embodiment of the present disclosure is disposed between the transmission interface and the receiving interface.
Figure 19:
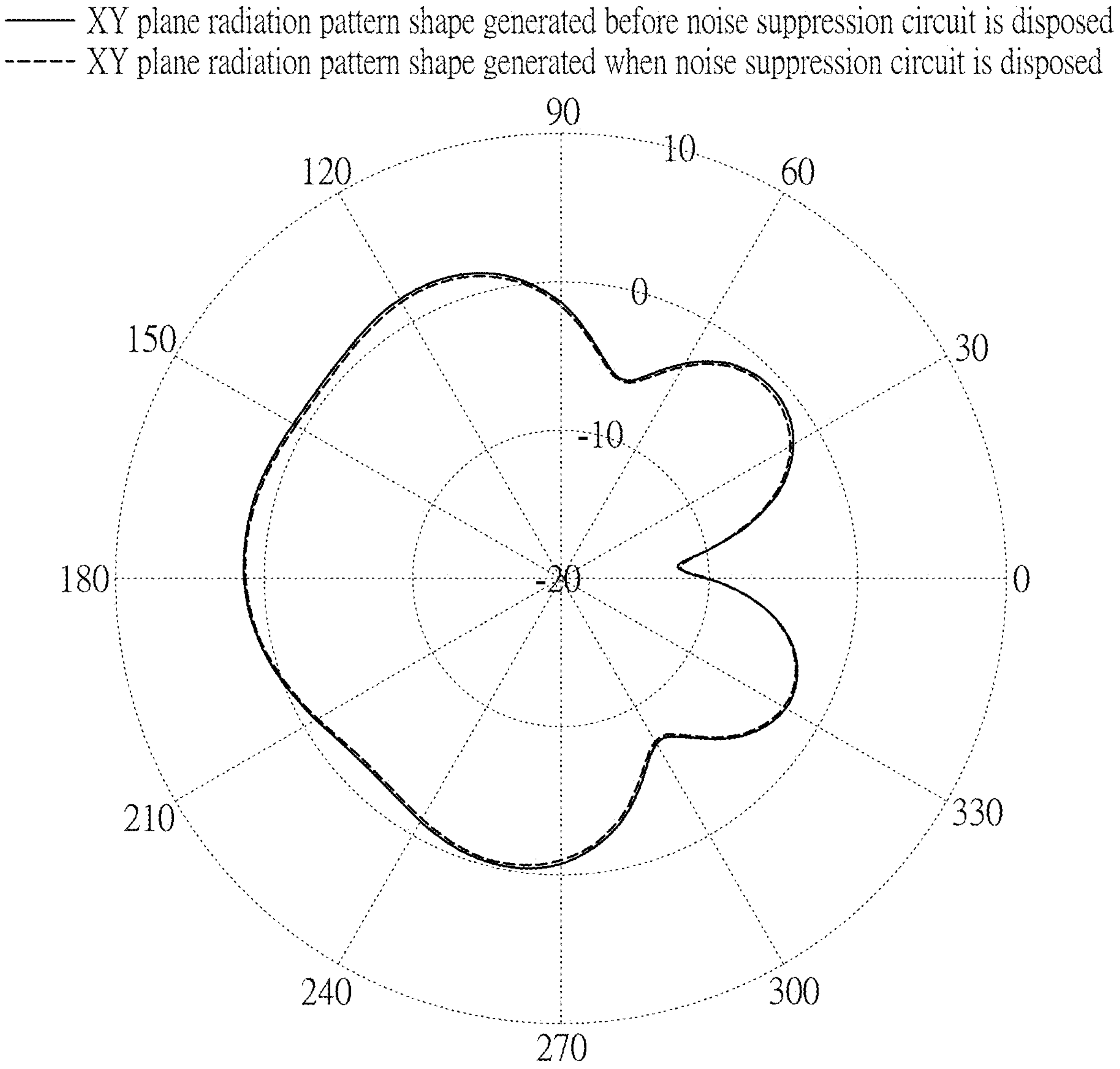
FIG. 19 is an example of XY plane radiation pattern of the antenna on the receiving interface with and without the noise suppression circuit of the fourth embodiment of the present disclosure between the transmission interface and the receiving interface.
Figure 20:
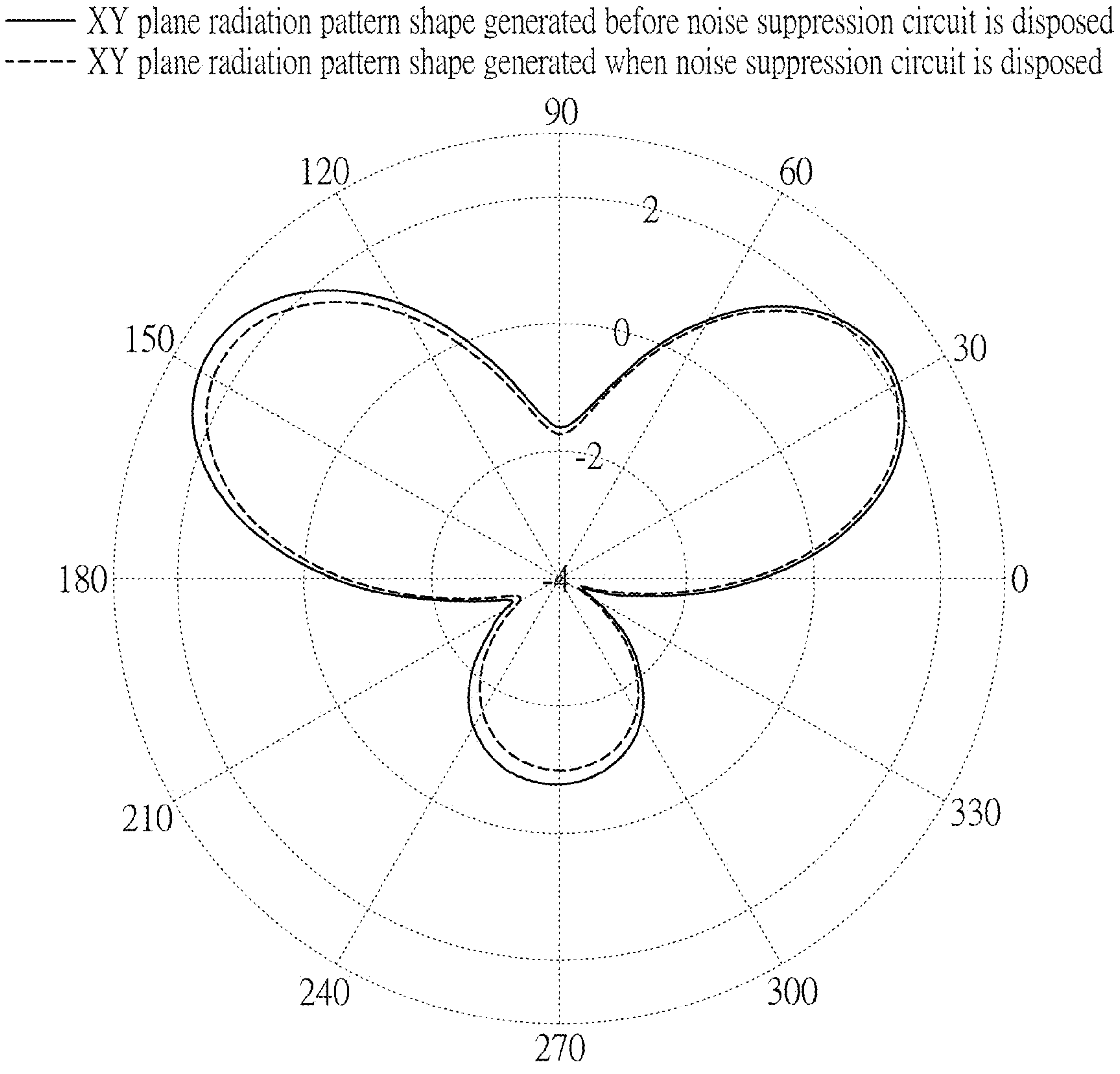
FIG. 20 is an example of XY plane radiation pattern of the antenna on the receiving interface with and without the noise suppression circuit of the fourth embodiment of the present disclosure between the transmission interface and the receiving interface.

Reference is made to FIG. 14 to FIG. 20, in which FIG. 14 is a schematic diagram of a noise suppression circuit disposed between a transmission interface and a receiving interface according to a fourth embodiment of the present disclosure, FIG. 15 is a S-parameter response of signals of a single port of the receiving interface (that is an antenna) when and before the noise suppression circuit of the fourth embodiment of the present disclosure is disposed between the transmission interface (that is a connector) and the receiving interface, FIG. 16 is a S-parameter response of signals transmitted from the transmission interface to the receiving interface when and before the noise suppression circuit of the fourth embodiment of the present disclosure is disposed between the transmission interface and the receiving interface, FIG. 17 is a schematic diagram showing quality of a signal that is transmitted on the transmission interface before the noise suppression circuit of the fourth embodiment of the present disclosure is disposed between the transmission interface and the receiving interface, FIG. 18 is a schematic diagram showing quality of a signal that is transmitted on the transmission interface when the noise suppression circuit of the fourth embodiment of the present disclosure is disposed between the transmission interface and the receiving interface, and FIG. 19 and FIG. 20 are an example of XY plane radiation pattern of the antenna on the receiving interface with and without the noise suppression circuit of the fourth embodiment of the present disclosure between the transmission interface and the receiving interface.

A transmission interface TX3 is the digital interface. A transmission interface connection point TX3A of the transmission interface TX3 is connected to the transmitter TCR. A transmission interface connection point TX3B at one side of the receiving interface RX3 is connected to other parts of the receiving interface RX3.

A receiving interface RX3 is a radio frequency receiving interface. A receiving interface connection point RX3A of the receiving interface RX3 is connected to an antenna ANT. A receiving interface connection point RX3B at one side of the receiving interface RX3 is connected to other parts of the receiving interface RX3.

In the fourth embodiment, a noise suppression circuit SYS3 is disposed between the transmission interface TX3 (that is the connector) and the receiving interface RX3 (that is the antenna).

The transmission interface TX3 is connected to the receiving interface RX3 through the noise suppression circuit SYS3.

In the fourth embodiment, the noise suppression circuit SYS3 mainly operates in a Wi-Fi frequency band of from 2.4 GHz to 2.5 GHz.

The noise suppression circuit SYS3 of the present disclosure includes the first noise suppression component S1, the second noise suppression component S2, the phase adjusting component S3, and the impedance components RSX1, RSX2. The first noise suppression component S1 is connected to the transmission interface TX3. The second noise suppression component S2 is connected to the receiving interface RX3. The phase adjusting component S3 is a transmission line connected between the first noise suppression component S1 and the second noise suppression component S2. For example, the impedance components RSX1, RSX2 are resistors (as terminal loads) each having a resistance of 50Ω, but the present disclosure is not limited thereto.

FIG. 15 is a S-parameter response showing changes in signals that are fed to the receiving interface connection point RX3B of the receiving interface RX3 (that is the antenna) when and before the noise suppression circuit SYS3 is disposed. As shown in FIG. 15, the noise suppression circuit SYS3 has a very small influence on an input response of the receiving interface RX3 (that is the antenna), and thus a function of the receiving interface RX3 is not affected thereby.

FIG. 16 is a S-parameter response showing changes in signals that are transmitted from the transmission interface connection point TX3B to the receiving interface connection point RX3B when and before the noise suppression circuit SYS3 is disposed. As shown in FIG. 16, more than 13 dB of noise that is caused by coupling between the transmission interface TX3 and the receiving interface RX3 in a frequency band (of from 2.46 GHz to 2.50 GHz) is significantly suppressed.

FIG. 17 and FIG. 18 are schematic diagrams showing an influence on quality of the transmission interface signal on the transmission interface TX3 by the noise suppression circuit of the fourth embodiment of the present disclosure. FIG. 17 is an eye diagram obtained (at a data transmission rate of 5 Gbps) when the transmission interface connection point TX3B is used as an input terminal, an output of the transmission interface TX3 such as the connector is used as an output terminal, and no noise suppression circuit SYS3 is not disposed between the input terminal and the output terminal. FIG. 18 is an eye diagram obtained when the transmission interface connection point TX3B is used as the input terminal, the output of the transmission interface TX3 such as the connector is used as the output terminal, and the noise suppression circuit SYS3 is disposed between the input terminal and the output terminal. As shown in FIG. 17 and FIG. 18, the noise suppression circuit has a very small influence on an input response of the transmission interface signal. Therefore, the noise suppression circuit SYS3 of the fourth embodiment of the present disclosure is a practical and effective noise suppression circuit.

The physical structures of the noise suppression circuit SYS3 of the fourth embodiment of the present disclosure whether cause additional influence or interference to the antenna ANT of the receiving interface RX3 are shown in FIG. 19 and FIG. 20.

The changes in the XY plane radiation pattern shapes that are generated on the receiving interface RX3 (that is the antenna) when and before the noise suppression circuit of the fourth embodiment of the present disclosure is disposed are shown and compared with each other in FIG. 19 and FIG. 20. The changes in the XY plane radiation pattern shape that is generated on the receiving interface RX3 (that is the antenna) before the noise suppression circuit SYS3 is disposed are marked by a solid line in FIG. 19 and FIG. 20. The changes in the XY plane radiation pattern shape that is generated when the noise suppression circuit SYS3 is disposed are marked by a dotted line in FIG. 19 and FIG. 20. As shown in FIG. 19 and FIG. 20, the noise suppression circuit SYS3 of the fourth embodiment of the present disclosure has a very small influence on the changes in the XY plane radiation pattern, and thus the function of the receiving interface RX3 (that is the antenna) is not affected thereby.

Fifth Embodiment

Figure 22:
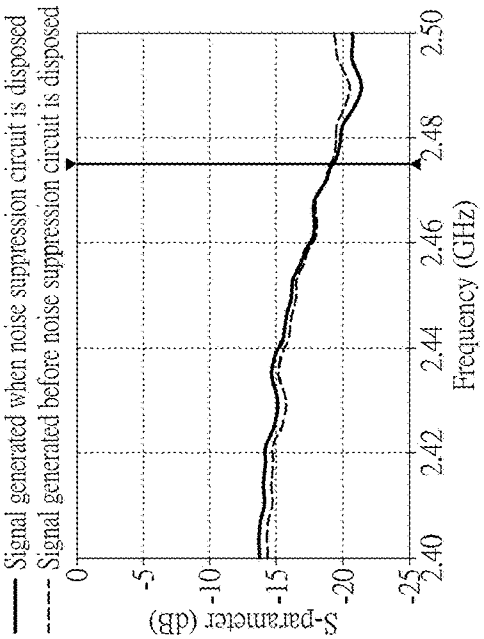
FIG. 22 is a S-parameter response of signals of a single port of the receiving interface (that is, an antenna) with and without the noise suppression circuit of the fifth embodiment of the present disclosure is disposed between the transmission interface and the receiving interface.
Figure 23:
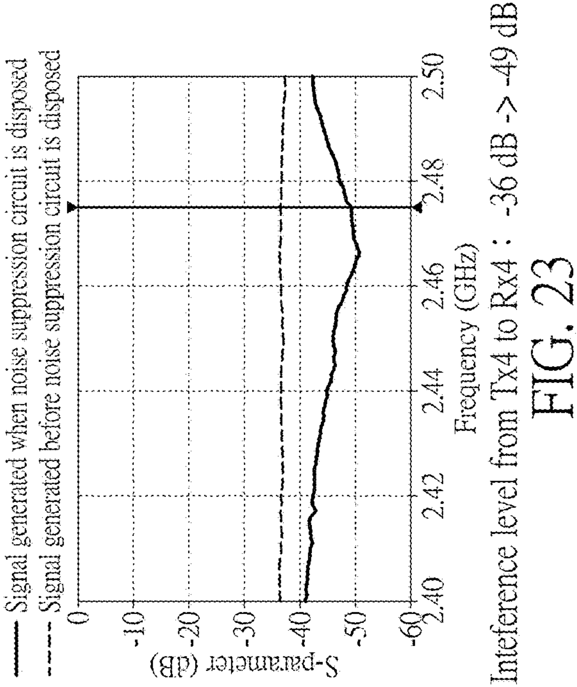
FIG. 23 is a S-parameter response of signals transmitted from the transmission interface (that is, a connector) to the receiving interface with and without the noise suppression circuit of the fifth embodiment of the present disclosure is disposed between the transmission interface and the receiving interface.
Figure 21:
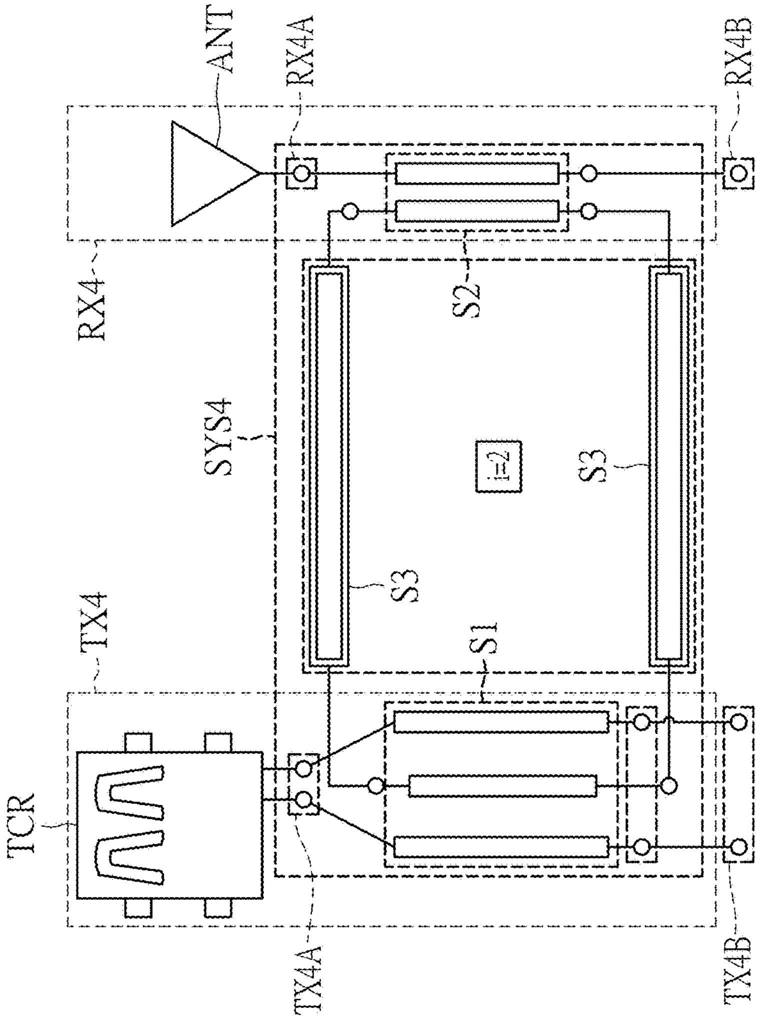
FIG. 21 is a schematic diagram of a noise suppression circuit disposed between a transmission interface and a receiving interface according to a fifth embodiment of the present disclosure.
Figure 24:
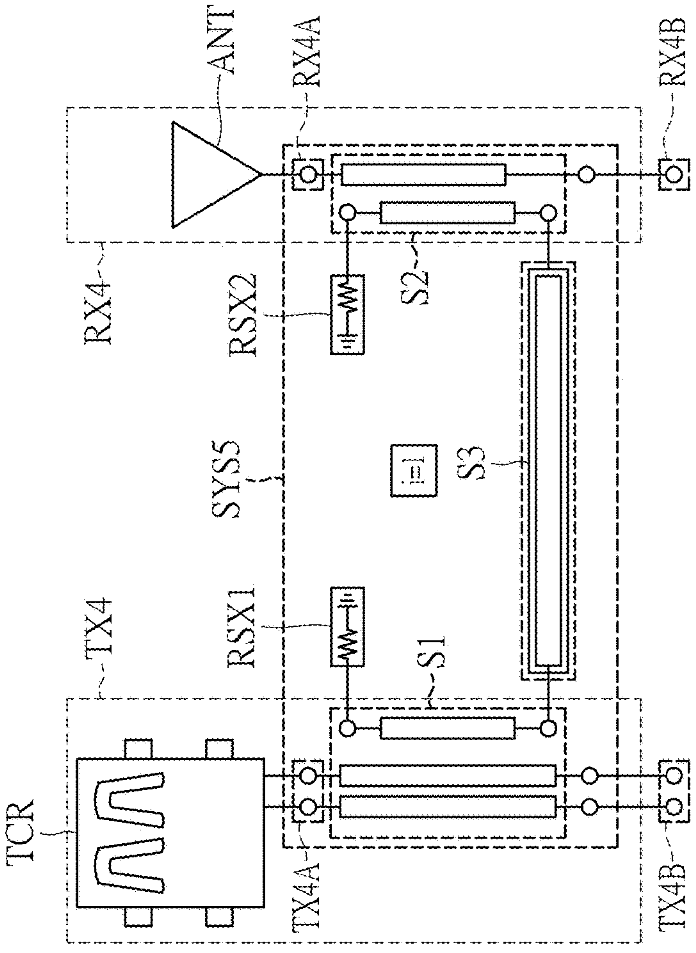
FIG. 24 is a schematic diagram of the noise suppression circuit disposed between the transmission interface and the receiving interface according to the fifth embodiment of the present disclosure.
Figure 25:
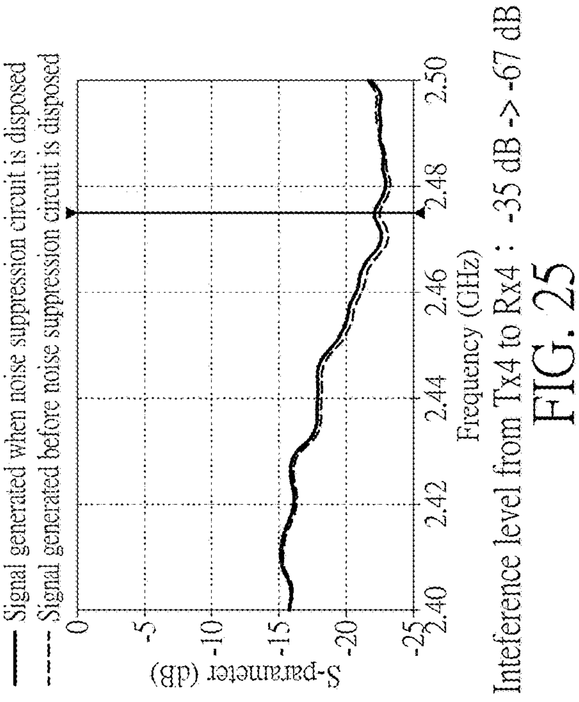
FIG. 25 is a S-parameter response of signals of a single port of the receiving interface with and without the noise suppression circuit of the fifth embodiment of the present disclosure is disposed between the transmission interface and the receiving interface.
Figure 26:
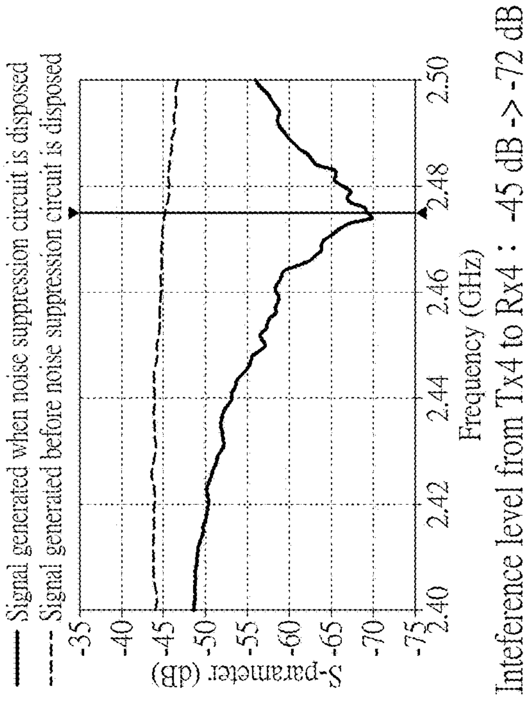
FIG. 26 is a S-parameter response of signals transmitted from the transmission interface to the receiving interface with and without the noise suppression circuit of the fifth embodiment of the present disclosure is disposed between the transmission interface and the receiving interface.

Reference is made to FIG. 21 to FIG. 26, in which FIG. 21 is a schematic diagram of a noise suppression circuit disposed between a transmission interface and a receiving interface according to a fifth embodiment of the present disclosure, FIG. 22 is a S-parameter response of signals of a single port of the receiving interface (that is an antenna) with and without the noise suppression circuit of the fifth embodiment of the present disclosure is disposed between the transmission interface and the receiving interface, FIG. 23 is a S-parameter response of signals transmitted from the transmission interface (that is a connector) to the receiving interface with and without the noise suppression circuit of the fifth embodiment of the present disclosure is disposed between the transmission interface and the receiving interface, FIG. 24 is a schematic diagram of the noise suppression circuit disposed between the transmission interface and the receiving interface according to the fifth embodiment of the present disclosure, FIG. 25 is a S-parameter response of signals of a single port of the receiving interface with and without the noise suppression circuit of the fifth embodiment of the present disclosure is disposed between the transmission interface and the receiving interface, and FIG. 26 is a S-parameter response of signals transmitted from the transmission interface to the receiving interface with and without the noise suppression circuit of the fifth embodiment of the present disclosure is disposed between the transmission interface and the receiving interface.

As shown in FIG. 21, in the fifth embodiment, a noise suppression circuit SYS4 of the present disclosure is disposed between a transmission interface TX4 and a receiving interface RX4. The transmission interface TX4 is the digital interface. A transmission interface connection point TX4A of the transmission interface TX4 is connected to the transmitter TCR. A transmission interface connection point TX4B at one side of the transmission interface TX4 is connected to other parts of the transmission interface TX4. The receiving interface RX4 is a radio frequency receiving interface. A receiving interface connection point RX4A of the receiving interface RX4 is connected to the antenna ANT. A receiving interface connection point RX4B at one side of the receiving interface RX4 is connected to other parts of the receiving interface RX4.

As shown in FIG. 24, in the fifth embodiment, a noise suppression circuit SYS5 of the present disclosure is disposed between the transmission interface TX4 and the receiving interface RX4. The transmission interface TX4 is the digital interface. The transmission interface connection point TX4A of the transmission interface TX4 is connected to the transmitter TCR. The transmission interface connection point TX4B at one side of the transmission interface TX4 is connected to other parts of the transmission interface TX4. The receiving interface RX4 is the radio frequency receiving interface. The receiving interface connection point RX4A of the receiving interface RX4 is connected to the antenna ANT. The receiving interface connection point RX4B at one side of the receiving interface RX4 is connected to other parts of the receiving interface RX4.

As shown in FIG. 21, the noise suppression circuit SYS4 is disposed between the transmission interface TX4 (that is the connector) and the receiving interface RX4 (that is the antenna). As shown in FIG. 24, the noise suppression circuit SYS5 is disposed between the transmission interface TX4 and the receiving interface RX4.

As shown in FIG. 21, the transmission interface TX4 is connected to the receiving interface RX4 through the noise suppression circuit SYS4.

As shown in FIG. 24, the transmission interface TX4 is connected to the receiving interface RX4 through the noise suppression circuit SYS5. The noise suppression circuit SYS5 mainly operates in the Wi-Fi frequency band of from 2.4 GHz to 2.5 GHz.

As shown in FIG. 21, the noise suppression circuit SYS4 of the present disclosure includes the first noise suppression component S1, the second noise suppression component S2 and the plurality of phase adjusting component S3. The first noise suppression component S1 of the noise suppression circuit SYS4 is connected to the transmission interface TX4. The second noise suppression component S2 of the noise suppression circuit SYS4 is connected to the receiving interface RX4. The phase adjusting component S3 of the noise suppression circuit SYS4 is a transmission line connected between the first noise suppression component S1 and the second noise suppression component S2.

As shown in FIG. 24, the noise suppression circuit SYS5 of the present disclosure includes the first noise suppression component S1, the second noise suppression component S2, the plurality of phase adjusting component S3, and the impedance components RSX1, RSX2. The first noise suppression component S1 of the noise suppression circuit SYS5 is connected to the transmission interface TX4. The second noise suppression component S2 of the noise suppression circuit SYS5 is connected to the receiving interface RX4. The phase adjusting component S3 of the noise suppression circuit SYS5 is the transmission line connected between the first noise suppression component S1 and the second noise suppression component S2. For example, the impedance components RSX1, RSX2 are resistors (as terminal loads) each having the resistance of 50Ω, but the present disclosure is not limited thereto.

FIG. 22 is a S-parameter response showing changes in signals that are fed to the receiving interface connection point RX4B of the receiving interface RX4 (that is the antenna) when and before the noise suppression circuit SYS4 is disposed. As shown in FIG. 22, the noise suppression circuit has a very small influence on an input response of the receiving interface RX4, and thus a function of the receiving interface RX4 is not affected thereby.

FIG. 23 is a S-parameter response showing changes in signals that are transmitted from the transmission interface connection point TX4B to the receiving interface connection point RX4B when and before the noise suppression circuit SYS4 is disposed. As shown in FIG. 23, more than 13 dB of noise that is caused by coupling between the transmission interface TX4 and the receiving interface RX4 in a frequency band (of from 2.45 GHz to 2.48 GHz) is significantly suppressed.

FIG. 25 is a S-parameter response showing changes in signals that are fed to the receiving interface connection point RX4B of the receiving interface RX4 (that is the antenna) when and before the noise suppression circuit SYS5 is disposed. As shown in FIG. 25, the noise suppression circuit SYS5 has a very small influence on an input response of the receiving interface RX4, and thus the function of the receiving interface RX4 is not affected thereby.

FIG. 26 is a S-parameter response showing changes in signals that are transmitted from the transmission interface connection point TX4B to the receiving interface connection point RX4B when and before the noise suppression circuit SYS5 is disposed. As shown in FIG. 26, more than 25 dB of noise that is caused by coupling between the transmission interface TX4 and the receiving interface RX4 in a frequency band (of from 2.42 GHz to 2.50 GHz) is significantly suppressed.

Sixth Embodiment

Figure 27:
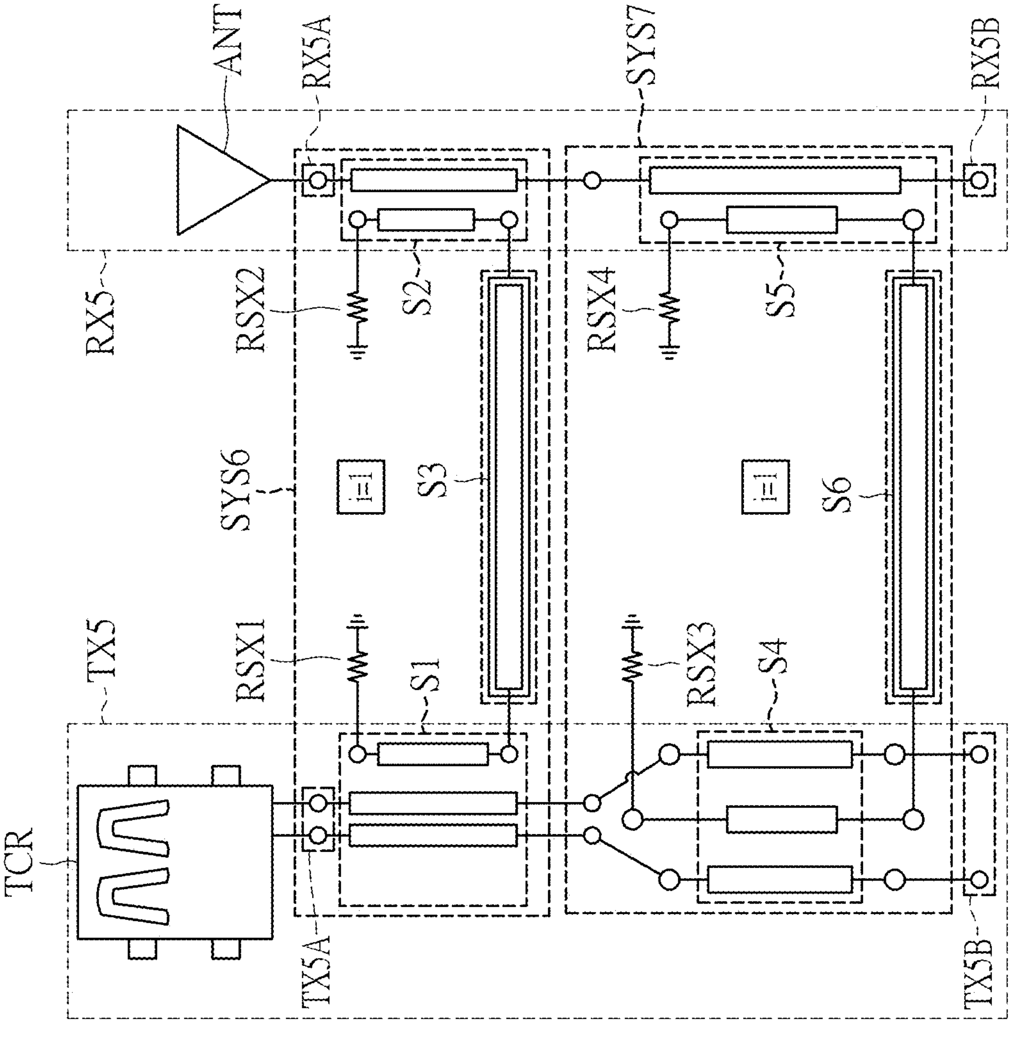
FIG. 27 is a schematic diagram of a noise suppression circuit disposed between a transmission interface and a receiving interface according to a sixth embodiment of the present disclosure.
Figure 28:
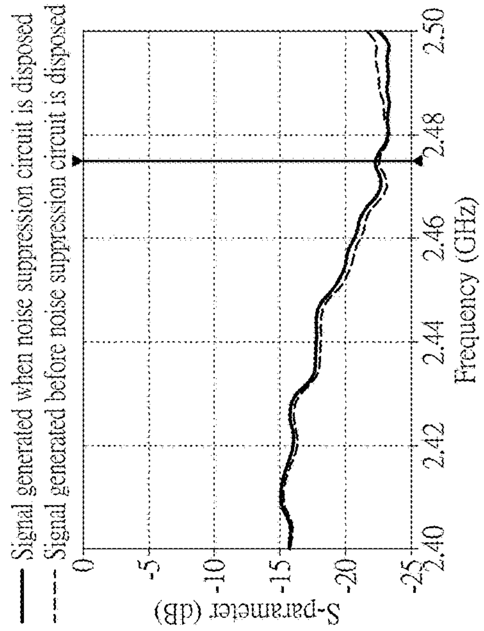
FIG. 28 is a S-parameter response of signals of a single port of the receiving interface (that is, an antenna) when the noise suppression circuit of the sixth embodiment of the present disclosure is disposed between the transmission interface and the receiving interface.
Figure 29:
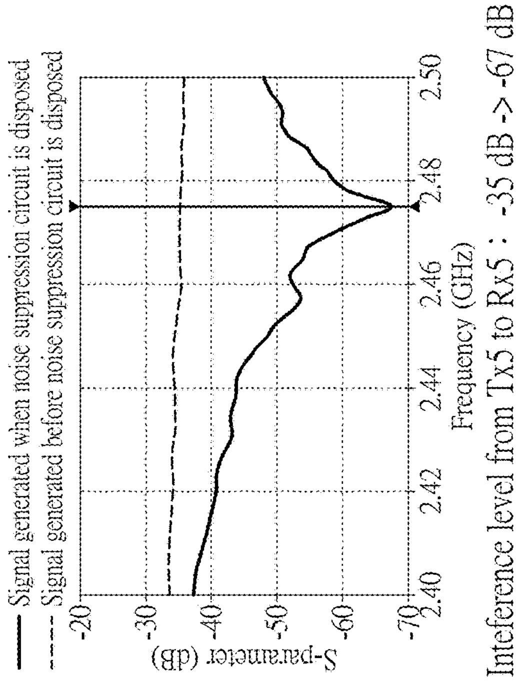
FIG. 29 is a S-parameter response of signals transmitted from the transmission interface (that is, a connector) to the receiving interface when and before the noise suppression circuit of the sixth embodiment of the present disclosure is disposed between the transmission interface and the receiving interface.
Figure 30:
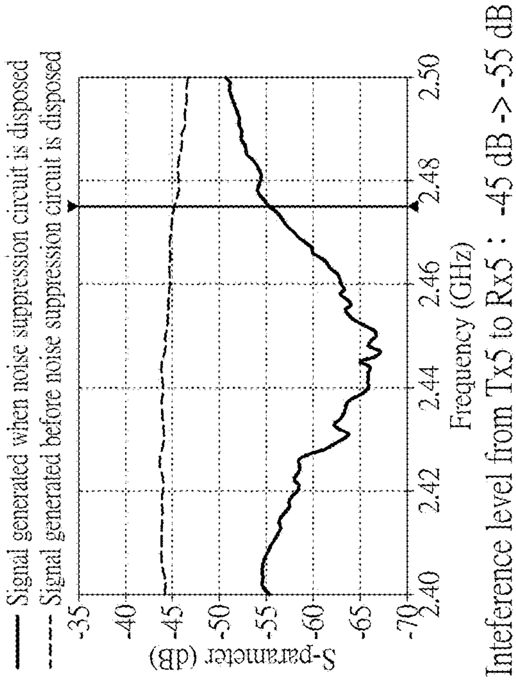
FIG. 30 is a S-parameter response of signals transmitted from the transmission interface to the receiving interface when and before the noise suppression circuit of the sixth embodiment of the present disclosure is disposed between the transmission interface and the receiving interface.

Reference is made to FIG. 27 to FIG. 30, in which FIG. 27 is a schematic diagram of a noise suppression circuit disposed between a transmission interface and a receiving interface according to a sixth embodiment of the present disclosure, FIG. 28 is a S-parameter response of signals of a single port of the receiving interface (that is an antenna) when the noise suppression circuit of the sixth embodiment of the present disclosure is disposed between the transmission interface and the receiving interface, and FIG. 29 and FIG. 30 are S-parameter response of signals transmitted from the transmission interface (that is a connector) to the receiving interface when and before the noise suppression circuit of the sixth embodiment of the present disclosure is disposed between the transmission interface and the receiving interface.

As shown in FIG. 27, in the sixth embodiment, a noise suppression circuit SYS6 of the present disclosure is disposed between the transmission interface TX5 and the receiving interface RX5. The transmission interface TX5 is the digital interface. A transmission interface connection point TX5A of the transmission interface TX5 is connected to the transmitter TCR. A a transmission interface connection point TX5B at one side of the transmission interface TX5 is connected to other parts of the transmission interface TX5. The receiving interface RX5 is a radio frequency receiving interface. A receiving interface connection point RX5A of the receiving interface RX5 is connected to the antenna ANT. A receiving interface connection point RX5B at one side of the receiving interface RX5 is connected to other parts of the receiving interface RX5.

The noise suppression circuit SYS6 and a noise suppression circuit SYS7 are disposed between the transmission interface TX5 (that is the connector) and the receiving interface RX5 (that is the antenna).

The transmission interface TX5 and the receiving interface RX5 are connected to each other through the noise suppression circuit SYS6 and the noise suppression circuit SYS7. The noise suppression circuit SYS6 and the noise suppression circuit SYS7 suppress radio frequency interference from the transmission interface TX5 to the receiving interface RX5. In the sixth embodiment, the noise suppression circuit SYS6 and the noise suppression circuit SYS7 operate in a Wi-Fi frequency band of from 2.4 GHz to 2.5 GHz.

The noise suppression circuit SYS6 includes the first noise suppression component S1, the second noise suppression component S2, the phase adjusting component S3 and the impedance components RSX1, RSX2. The noise suppression circuit SYS7 includes a fourth noise suppression component S4, a fifth noise suppression component S5, a sixth phase adjusting components S6 and the impedance components RSX3, RSX4. The first noise suppression component S1 and the fourth noise suppression component S4 are connected to the transmission interface TX5. The second noise suppression component S2 and the fifth noise suppression component S5 are connected to the receiving interface RX5. The phase adjusting component S3 is the transmission line connected between the first noise suppression component S1 and the second noise suppression component S2. The sixth phase adjusting components S6 is a transmission line connected between the fourth noise suppression component S4 and the fifth noise suppression component S5. For example, the impedance components RSX1 to RSX4 are resistors (as terminal loads) each having the resistance of 50Ω, but the present disclosure is not limited thereto.

FIG. 28 is a S-parameter response showing changes in signals that are fed to the receiving interface connection point RX5B of the receiving interface RX5 (that is the antenna) when and before the noise suppression circuits SYS6, SYS7 are disposed between a transmission interface TX5 and a receiving interface RX5. As shown in FIG. 28, the noise suppression circuit SYS6 has a very small influence on an input response of the receiving interface RX5, and thus a function of the receiving interface RX5 is not affected thereby.

FIG. 29 and FIG. 30 are S-parameter response showing changes in signals that are transmitted from the transmission interface connection point TX5B to the receiving interface connection point RX5B when and before the noise suppression circuits SYS6, SYS7 are disposed. As shown in FIG. 29 and FIG. 30, more than 20 dB of noise that is caused by coupling between the transmission interface TX5 and the receiving interface RX5 in a frequency band (of from 2.40 GHz to 2.50 GHz) is significantly suppressed.

Seventh Embodiment

Figure 31:
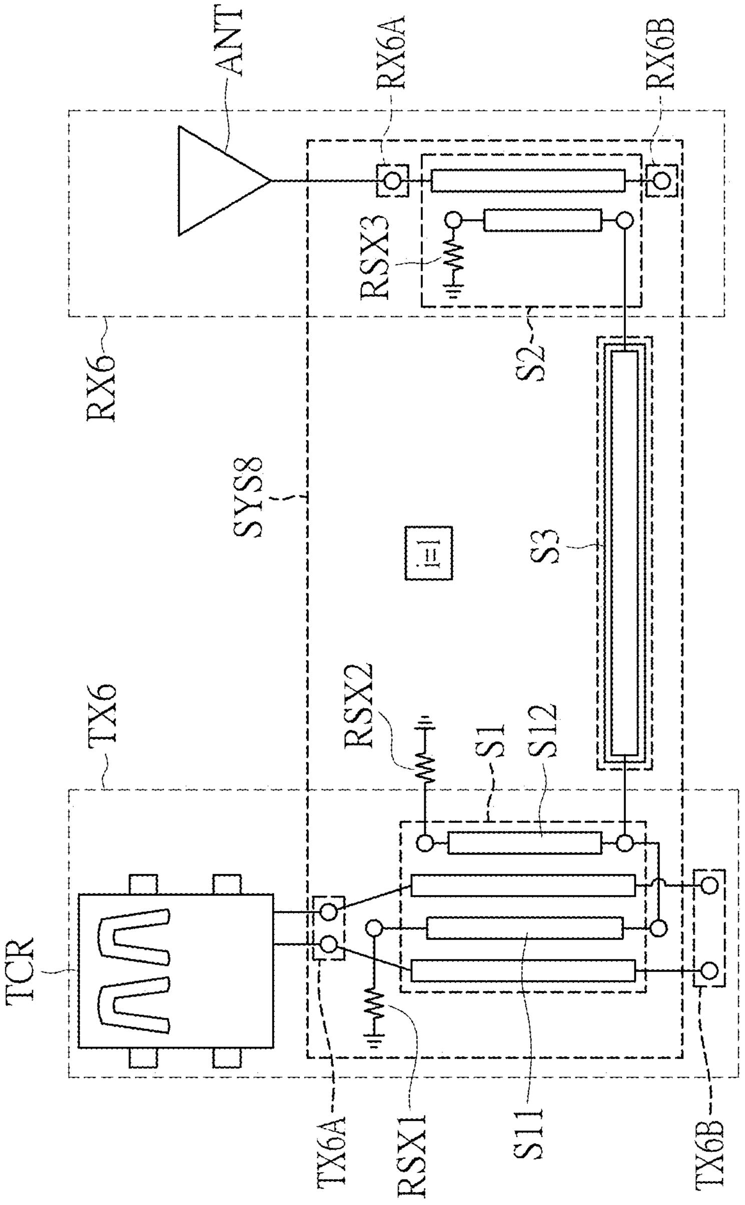
FIG. 31 is a schematic diagram of a noise suppression circuit disposed between a transmission interface and a receiving interface according to a seventh embodiment of the present disclosure.
Figure 32:
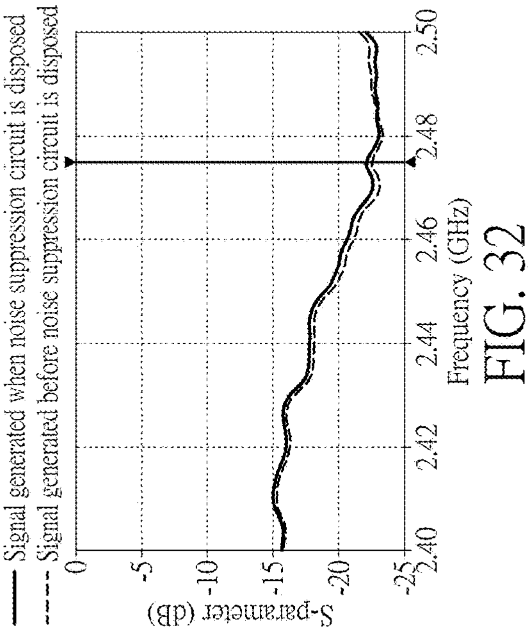
FIG. 32 is a S-parameter response of signals of a single port of the receiving interface (that is, an antenna) with and without the noise suppression circuit of the seventh embodiment of the present disclosure is disposed between the transmission interface and the receiving interface.
Figure 33:
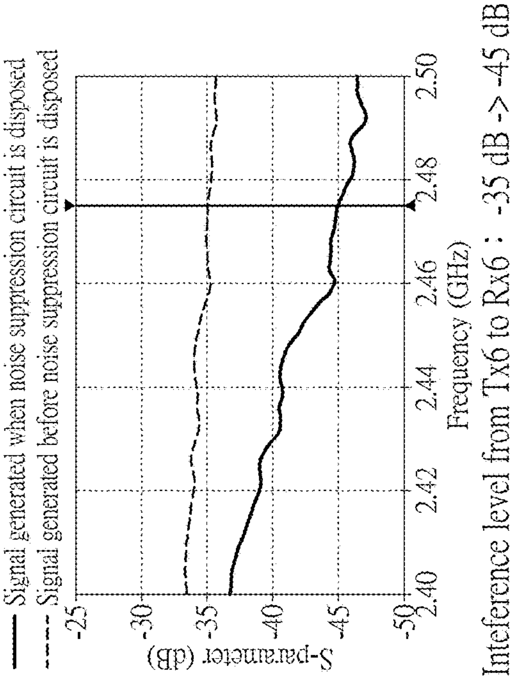
FIG. 33 is a S-parameter response of signals transmitted from the transmission interface (that is, a connector) to the receiving interface with and without the noise suppression circuit of the seventh embodiment of the present disclosure is disposed between the transmission interface and the receiving interface.
Figure 34:
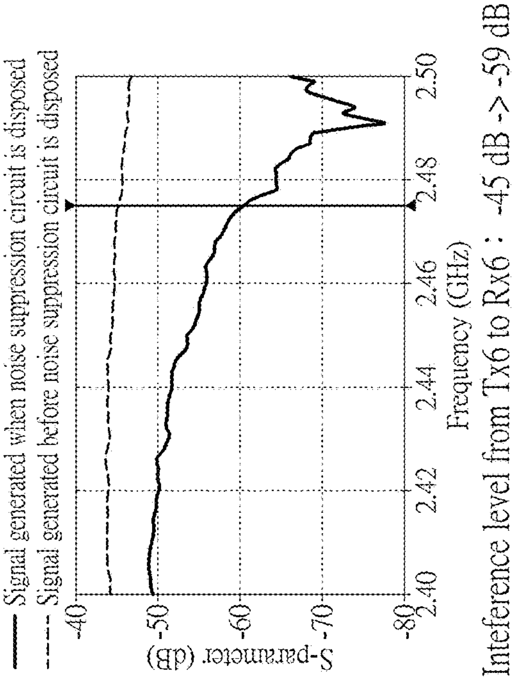
FIG. 34 is a S-parameter response of signals transmitted from the transmission interface to the receiving interface with and without the noise suppression circuit of the seventh embodiment of the present disclosure is disposed between the transmission interface and the receiving interface.

Reference is made to FIG. 31 to FIG. 34, in which FIG. 31 is a schematic diagram of a noise suppression circuit disposed between a transmission interface and a receiving interface according to a seventh embodiment of the present disclosure, FIG. 32 is a S-parameter response of signals of a single port of the receiving interface (that is an antenna) with and without the noise suppression circuit of the seventh embodiment of the present disclosure is disposed between the transmission interface and the receiving interface, and FIG. 33 and FIG. 34 are S-parameter response of signals transmitted from the transmission interface to the receiving interface with and without the noise suppression circuit of the seventh embodiment of the present disclosure is disposed between the transmission interface and the receiving interface.

As shown in FIG. 31, in the seventh embodiment, a noise suppression circuit SYS8 of the present disclosure is disposed between a transmission interface TX6 (that is the connector) and a receiving interface RX6 (that is the antenna). The transmission interface TX6 is the digital interface. A transmission interface connection point TX6A of the transmission interface TX6 is connected to the transmitter TCR. A transmission interface connection point TX6B at one side of the receiving interface RX6 is connected to other parts of the receiving interface RX6.

The receiving interface RX6 is a radio frequency receiving interface. The receiving interface connection point RX6A of the receiving interface RX6 is connected to the antenna ANT. A receiving interface connection point RX6B at one side of the receiving interface RX6 is connected to other parts of the receiving interface RX6.

The transmission interface TX6 is connected to the receiving interface RX6 through the noise suppression circuit SYS8. In the seventh embodiment, the noise suppression circuit SYS8 mainly operates in the Wi-Fi frequency band of from 2.4 GHz to 2.5 GHz.

As shown in FIG. 31, the noise suppression circuit SYS8 of the present disclosure includes the first noise suppression component S1, the second noise suppression component S2, the plurality of phase adjusting components S3, and the impedance components RSX1 to RSX3. The first noise suppression component S1 of the noise suppression circuit SYS8 is connected to the transmission interface TX6. The second noise suppression component S2 of the noise suppression circuit SYS8 is connected to the receiving interface RX6. The phase adjusting component S3 of the noise suppression circuit SYS8 is the transmission line connected between the first noise suppression component S1 and the second noise suppression component S2. For example, the impedance components RSX1 to RSX3 are resistors (as terminal loads) each having the resistance of 50Ω, but the present disclosure is not limited thereto.

FIG. 32 is a S-parameter response showing changes in signals that are fed to the receiving interface connection point RX6B of the receiving interface RX6 (that is the antenna) when and before the noise suppression circuit SYS8 is disposed between the transmission interface TX6 and the receiving interface RX6. As shown in FIG. 32, the noise suppression circuit SYS8 has a very small influence on an input response of the receiving interface RX6, and thus a function of the receiving interface RX6 is not affected thereby.

FIG. 33 and FIG. 34 are S-parameter response showing changes in signals that are transmitted from the transmission interface connection point TX6B to the receiving interface connection point RX6B when and before the noise suppression circuit SYS8 is disposed. As shown in FIG. 33 and FIG. 34, more than 10 dB of noise that is caused by coupling between the transmission interface TX6 and the receiving interface RX6 in a frequency band (of from 2.46 GHz to 2.50 GHz) is significantly suppressed.

Figure 35:
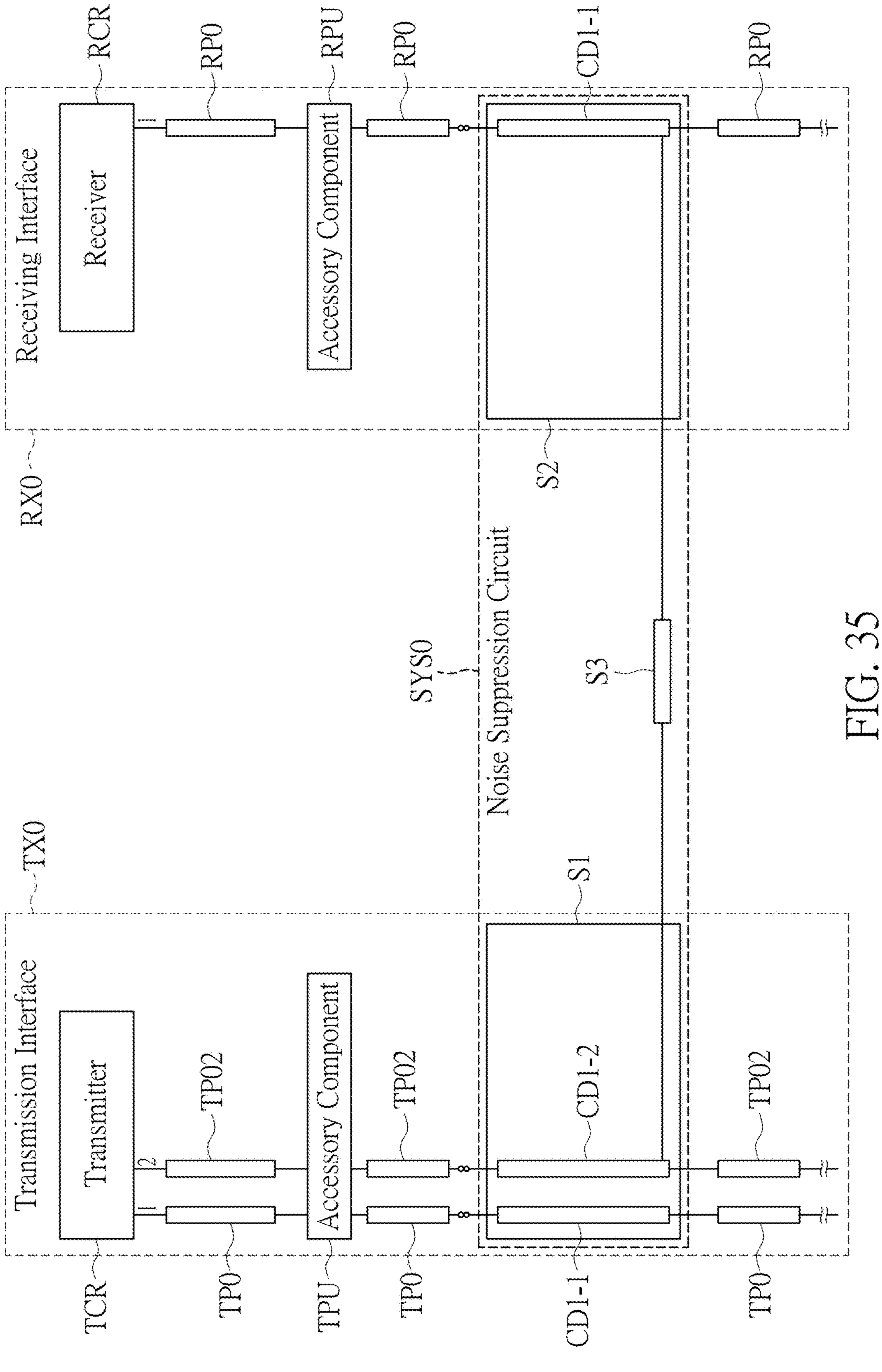
FIG. 35 is a schematic diagram of a noise suppression circuit disposed between a transmission interface and a receiving interface according to an eighth embodiment of the present disclosure.

Reference is made to FIG. 35, which is a schematic diagram of a noise suppression circuit disposed between a transmission interface and a receiving interface according to an eighth embodiment of the present disclosure.

A difference between the noise suppression circuit SYS0 as shown in FIG. 35 and the noise suppression circuit SYS0 as shown in FIG. 1 is that, the noise suppression circuit SYS0 as shown in FIG. 35 further includes a first conductor CD1-2. The first conductor CD1-2 is disposed on a transmission path TP02. The first conductor CD1-2 and the transmission path TP02 are disposed adjacent to the first conductor CD1-1 and the transmission path TP0.

As shown in FIG. 1, the noise suppression circuit SYS0 only includes the first conductor CD1-1 and the transmission path TP0. In contrast, as shown in FIG. 35, the noise suppression circuit SYS0 includes the first conductors CD1-1, CD1-2 and the transmission paths TP0, TP02.

It is worth noting that, as shown in FIG. 35, the noise suppression circuit SYS0 is disposed between the transmission interface TX0 and the receiving interface RX0. The transmission interface TX0 includes the digital interface, the power transmission interface or a combination thereof.

It should be understood that, differential signals are mainly transmitted through the digital interface. Therefore, the noise suppression circuit SYS0 as shown in FIG. 35 is particularly suitable for transmission of the differential signals or other digital signals, which may be the most common application scenario in the future.

Figure 36:
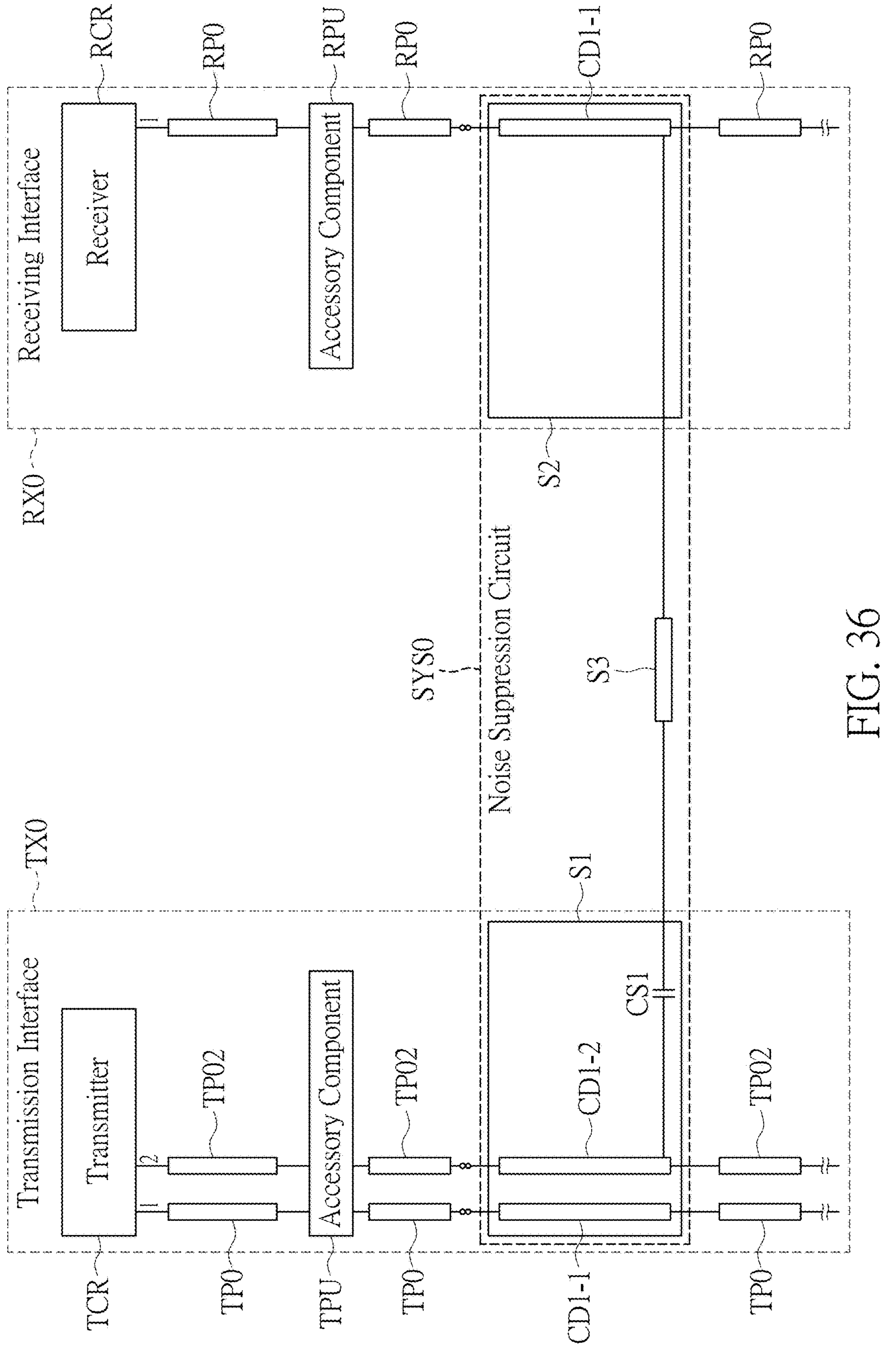
FIG. 36 is a schematic diagram of a noise suppression circuit disposed between a transmission interface and a receiving interface according to a ninth embodiment of the present disclosure.

Reference is made to FIG. 36, which is a schematic diagram of a noise suppression circuit disposed between a transmission interface and a receiving interface according to a ninth embodiment of the present disclosure.

A difference between the noise suppression circuit SYS0 as shown in FIG. 36 and the noise suppression circuit SYS0 as shown in FIG. 35 is that, the noise suppression circuit SYS0 as shown in FIG. 36 further includes a capacitor CS1.

As shown in FIG. 36, the capacitor CS1 is disposed between the first conductor CD1-2 of the transmission interface TX0 and the phase adjusting component S3 for suppressing signals (that are the transmission interface signals described herein) transmitted from the first conductor CD1-2 of the transmission interface TX0 through the capacitor CS1 to the phase adjusting component S3.

Figure 37:
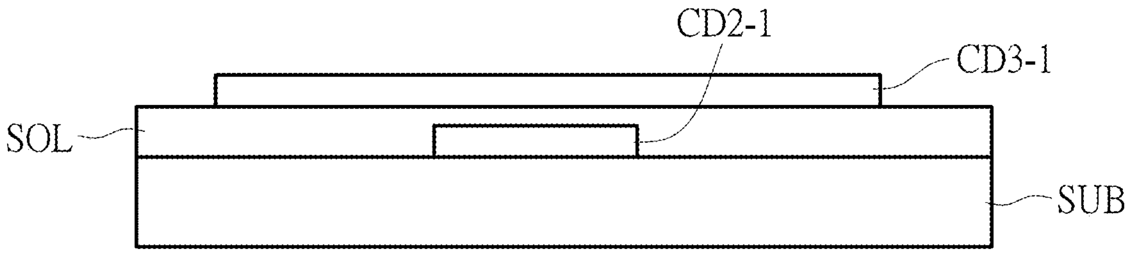
FIG. 37 is a schematic diagram of a third conductor disposed above a second conductor in a noise suppression circuit according to a tenth embodiment of the present disclosure.

Reference is made to FIG. 37, which is a schematic diagram of a third conductor disposed above a second conductor in a noise suppression circuit according to a tenth embodiment of the present disclosure.

The third conductor CD3-1 may be disposed above the first conductor CD1-2. The second conductor CD2-1 is in a solder mask layer SOL, and the solder mask layer SOL is formed on a circuit board base material SUB.

In conclusion, the present disclosure provides the noise suppression circuit. The noise suppression circuit of the present disclosure includes the first noise suppression component and the second noise suppression component. Each or any of the first noise suppression component and the second noise suppression component includes the first conductor. The first conductor of the first noise suppression component and the first conductor of the second noise suppression component are connected to the transmission paths and the phase adjusting component.

Each or any of the first noise suppression component and the second noise suppression component of the noise suppression circuit of the present disclosure further includes the second conductor and the third conductor. The second conductor of the first noise suppression component and the second conductor of the second noise suppression component are connected to the transmission paths. The third conductor of the first noise suppression component is disposed at one side of the second conductor of the first noise suppression component. The third conductor of the second noise suppression component is disposed at one side of the second conductor of the second noise suppression component. The third conductor of the first noise suppression component and the third conductor of the second noise suppression component are connected to the phase adjusting component.

The noise suppression circuit of the present disclosure is capable of effectively suppressing the radio frequency interference from the transmission interface to the receiving interface for improving communication quality of the receiving interface. When the noise suppression circuit of the present disclosure is used between the transmission interface and the receiving interface, the electronic product does not need to be covered with the metal foils such as copper foils or the absorbing materials.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A noise suppression circuit disposed between a transmission interface and a receiving interface for eliminating interference from the transmission interface to the receiving interface, wherein the transmission interface includes a digital interface, a power transmission interface or a combination thereof, the noise suppression circuit comprising:

a plurality of noise suppression components including:

a first noise suppression component connected to one or more transmission paths of the transmission interface; and a second noise suppression component connected to one or more transmission paths of the receiving interface that are different from the one or more transmission paths of the transmission interface; and one or more coupling paths;

wherein the first noise suppression component includes one or more signal input ports, one or more signal output ports and one or more coupling ports;

wherein, inside the first noise suppression component, the one or more signal output ports are connected to the one or more signal input ports of the first noise suppression component through the one or more transmission paths of the transmission interface;

wherein, outside the first noise suppression component, the one or more signal input ports of the first noise suppression component is connected to one part of the one or more transmission paths of the transmission interface, the one or more signal output ports of the first noise suppression component is connected to another part of the one or more transmission paths of the transmission interface, and the first noise suppression component obtains or replicates parts or all of power from the one or more transmission paths of the transmission interface and outputs the power to the one or more coupling ports of the first noise suppression component;

wherein the second noise suppression component includes one or more signal input ports, one or more signal output ports and one or more coupling ports;

wherein, inside the second noise suppression component, the one or more signal output ports are connected to the one or more signal input ports of the second noise suppression component through the one or more transmission paths of the receiving interface;

wherein, outside the second noise suppression component, the one or more signal input ports of the second noise suppression component is connected to one part of the one or more transmission paths of the receiving interface, the one or more signal output ports of the second noise suppression component is connected to another part of the one or more transmission paths of the receiving interface, and the second noise suppression component obtains or replicates parts or all of power from the one or more coupling ports of the second noise suppression component and outputs the power to the one or more signal output ports of the second noise suppression component;

wherein the one or more coupling ports of the first noise suppression component are partly or completely connected to the one or more coupling ports of the second noise suppression component through the one or more coupling paths, and one or more phase adjusting component is disposed on the one or more coupling paths for providing a predetermined phase at a predetermined frequency.

2. The noise suppression circuit according to claim 1, wherein, in the noise suppression circuit, the one or more transmission paths of the transmission interface is in direct current connected with the one or more coupling ports of the transmission interface, or is electromagnetically coupled with the one or more coupling ports of the transmission interface;

wherein the one or more transmission paths of the receiving interface is in direct current connected with the one or more coupling ports of the receiving interface, or is electromagnetically coupled with the one or more coupling ports of the receiving interface.

3. The noise suppression circuit according to claim 1, wherein, in first noise suppression component, a sensor senses signals and noise on the one or more transmission paths of the transmission interface and the receiving interface, and directly outputs all or parts of the signals and the noise to the one or more coupling ports, or replicates all or parts of the signals and the noise and then outputs the signals and the noise that are replicate to the one or more coupling ports.

4. The noise suppression circuit according to claim 1, wherein the one or more coupling ports are connected to one or more impedance components of the first noise suppression component, or the one or more coupling ports are connected to one or more impedance components of the second noise suppression component.

5. The noise suppression circuit according to claim 1, wherein the phase adjusting component includes one or more transmission line having a specific length or a phase synthesis circuit for providing the predetermined phase at the predetermined frequency.

6. The noise suppression circuit according to claim 1, further comprising:

one or more intensity adjusting circuit disposed on the one or more coupling paths, and configured to adjust amount of power transmitted on the one or more coupling paths at the predetermined frequency, wherein the one or more intensity adjusting circuit includes an attenuator or an amplifier.

7. The noise suppression circuit according to claim 1, further comprising:

a filter circuit disposed on the one or more coupling paths.

8. The noise suppression circuit according to claim 1, wherein a physical structure is used for transmission on the one or more coupling paths.

9. The noise suppression circuit according to claim 1, wherein the plurality of noise suppression components are connected to the transmission interface or the receiving interface.

10. The noise suppression circuit according to claim 9, wherein a physical structure is used for transmission on the one or more coupling paths.

* * * * *